(12) United States Patent
Liang

(10) Patent No.: US 12,444,427 B2
(45) Date of Patent: Oct. 14, 2025

(54) AUDIO ENCODING METHOD, AUDIO DECODING METHOD, APPARATUS, COMPUTER DEVICE, STORAGE MEDIUM, AND COMPUTER PROGRAM PRODUCT

(71) Applicant: Tencent Technology (Shenzhen) Company Limited, Shenzhen (CN)

(72) Inventor: Junbin Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 512 days.

(21) Appl. No.: 17/978,905

(22) Filed: Nov. 1, 2022

(65) Prior Publication Data

US 2023/0046509 A1   Feb. 16, 2023

Related U.S. Application Data

(63) Continuation of application No. PCT/CN2022/081414, filed on Mar. 17, 2022.

(30) Foreign Application Priority Data

Apr. 9, 2021   (CN) .......................... 202110380547.9

(51) Int. Cl.
*G10L 19/24* (2013.01)
*G06N 3/044* (2023.01)
(Continued)

(52) U.S. Cl.
CPC .............. *G10L 19/24* (2013.01); *G06N 3/044* (2023.01); *G06N 3/08* (2013.01); *G10L 19/167* (2013.01); *G10L 25/60* (2013.01); *G10L 25/69* (2013.01)

(58) Field of Classification Search
CPC ....... G10L 19/24; G10L 19/167; G10L 25/60; G10L 25/69; G10L 25/30; G10L 19/002;
(Continued)

(56) References Cited

U.S. PATENT DOCUMENTS 5,710,863 A * 1/1998 Chen ................... G10L 19/0212
704/229
5,778,335 A * 7/1998 Ubale ..................... G10L 19/12
704/E19.041
(Continued)

FOREIGN PATENT DOCUMENTS

CN       104143335 A      11/2014
CN       104517612 A       4/2015
(Continued)

OTHER PUBLICATIONS

Tencent Technology, WO, PCT/CN2022/081414, May 26, 2022, 5 pgs.
(Continued)

*Primary Examiner* — Thuykhanh Le
(74) *Attorney, Agent, or Firm* — Morgan, Lewis & Bockius LLP

(57) ABSTRACT

An audio encoding bit rate prediction model training method is performed by a computer device. The method includes: obtaining a sample audio feature parameter corresponding to each of sample audio frames in a first sample audio; performing encoding bit rate prediction on the sample audio feature parameter through an encoding bit rate prediction model, to obtain a sample encoding bit rate for each of the sample audio frames; performing audio encoding on the sample audio frames based on the corresponding sample encoding bit rates to generate sample audio data corresponding to the sample audio frames; performing audio decoding on the sample audio data, to obtain a second sample audio corresponding to the sample audio data; and training the
(Continued)

encoding bit rate prediction model based on the first sample audio and the second sample audio until a sample encoding quality score reaches a target encoding quality score.

17 Claims, 8 Drawing Sheets

(51) Int. Cl.
*G06N 3/08* (2023.01)
*G10L 19/16* (2013.01)
*G10L 25/60* (2013.01)
*G10L 25/69* (2013.01)

(58) Field of Classification Search
CPC ........ G06N 3/044; G06N 3/08; G06N 3/0442; G06N 3/0464
USPC .......................................................... 704/500
See application file for complete search history.

(56) References Cited

U.S. PATENT DOCUMENTS

| | | | | |
|---|---|---|---|---|
| 5,966,689 | A * | 10/1999 | McCree | G10L 19/26 704/226 |
| 5,995,923 | A * | 11/1999 | Mermelstein | G10L 19/16 704/223 |
| 6,172,974 | B1 * | 1/2001 | Tseng | H04Q 3/0025 370/357 |
| 6,345,255 | B1 * | 2/2002 | Mermelstein | G10L 19/18 704/E19.041 |
| 6,370,502 | B1 * | 4/2002 | Wu | G10L 19/00 704/E19.02 |
| 6,377,916 | B1 * | 4/2002 | Hardwick | G10L 19/0212 704/265 |
| 6,745,024 | B1 * | 6/2004 | DeJaco | H04L 51/58 709/217 |
| 6,963,833 | B1 * | 11/2005 | Singhal | G10L 25/90 704/207 |
| 7,116,266 | B1 * | 10/2006 | Vesel | G01S 13/765 342/36 |
| 7,272,556 | B1 * | 9/2007 | Aguilar | G10L 19/002 704/226 |
| 8,589,151 | B2 * | 11/2013 | Chamberlain | G10L 19/173 704/229 |
| 8,897,370 | B1 | 11/2014 | Wang et al. | |
| 9,111,525 | B1 * | 8/2015 | Mouchtaris | G10L 19/008 |
| 9,576,590 | B2 * | 2/2017 | Sjoberg | G10L 19/26 |
| 9,659,567 | B2 * | 5/2017 | Villemoes | G10L 19/04 |
| 11,704,178 | B2 * | 7/2023 | Sharifi Tehrani | G06N 20/00 714/704 |
| 2002/0016711 | A1 * | 2/2002 | Manjunath | G10L 19/125 704/E19.036 |
| 2002/0099548 | A1 * | 7/2002 | Manjunath | G10L 19/24 704/266 |
| 2002/0143556 | A1 * | 10/2002 | Kadatch | G10L 19/032 704/500 |
| 2003/0115041 | A1 * | 6/2003 | Chen | G10L 19/002 704/E19.01 |
| 2003/0176934 | A1 * | 9/2003 | Gopalan | G11B 20/00891 700/94 |
| 2004/0153317 | A1 * | 8/2004 | Chamberlain | G10L 19/173 704/219 |
| 2004/0158463 | A1 * | 8/2004 | Jabri | G10L 19/173 704/219 |
| 2005/0071153 | A1 * | 3/2005 | Tammi | G10L 19/08 704/219 |
| 2005/0252361 | A1 * | 11/2005 | Oshikiri | G10L 19/22 704/E19.044 |
| 2005/0256702 | A1 * | 11/2005 | Vadapalli | G10L 19/12 704/223 |
| 2006/0073786 | A1 * | 4/2006 | Sarkar | H04M 7/0084 455/24 |
| 2006/0265211 | A1 * | 11/2006 | Canniff | G10L 25/69 704/E19.002 |
| 2007/0011009 | A1 * | 1/2007 | Nurminen | G10L 13/06 704/260 |
| 2007/0016404 | A1 * | 1/2007 | Kim | G10L 19/035 704/E19.016 |
| 2007/0255562 | A1 * | 11/2007 | Kurniawati | G10L 19/035 704/230 |
| 2008/0004869 | A1 * | 1/2008 | Herre | G10L 19/22 704/211 |
| 2009/0037166 | A1 * | 2/2009 | Wang | G10L 19/035 704/229 |
| 2010/0241433 | A1 * | 9/2010 | Herre | G10L 19/022 704/500 |
| 2011/0102553 | A1 * | 5/2011 | Corcoran | H04N 23/74 382/154 |
| 2012/0051435 | A1 * | 3/2012 | Hong | H04N 19/20 375/240.18 |
| 2012/0290295 | A1 * | 11/2012 | Eksler | G10L 19/12 704/219 |
| 2013/0132099 | A1 * | 5/2013 | Oshikiri | G10L 19/22 704/500 |
| 2013/0262128 | A1 * | 10/2013 | Teutsch | G10L 21/0364 704/500 |
| 2014/0112481 | A1 * | 4/2014 | Li | G10L 19/008 381/23 |
| 2015/0332701 | A1 * | 11/2015 | Nagel | G10L 21/0388 704/500 |
| 2016/0307469 | A1 * | 10/2016 | Zhou | G09B 21/009 |
| 2016/0366274 | A1 * | 12/2016 | Yang | H04M 3/22 |
| 2018/0082704 | A1 * | 3/2018 | Xiao | G10L 25/69 |
| 2018/0233154 | A1 * | 8/2018 | Vaillancourt | G10L 19/06 |
| 2018/0270288 | A1 | 9/2018 | Wang et al. | |
| 2018/0288419 | A1 | 10/2018 | Yu et al. | |
| 2018/0349757 | A1 * | 12/2018 | Ando | G06V 10/945 |
| 2019/0028114 | A1 * | 1/2019 | Fannes | H03M 7/30 |
| 2019/0082276 | A1 * | 3/2019 | Crow | H04R 25/505 |
| 2019/0124375 | A1 * | 4/2019 | Lundberg | H04N 21/44008 |
| 2019/0318237 | A1 * | 10/2019 | Tashev | G06F 3/165 |
| 2021/0074308 | A1 * | 3/2021 | Skordilis | G10L 19/09 |
| 2021/0233544 | A1 * | 7/2021 | Werner | G10L 19/022 |
| 2021/0264938 | A1 * | 8/2021 | Yao | G06N 3/08 |
| 2022/0007067 | A1 * | 1/2022 | Takahashi | H04N 17/004 |
| 2022/0044693 | A1 * | 2/2022 | Liang | H04L 65/80 |
| 2022/0156584 | A1 * | 5/2022 | Fersch | G10L 19/00 |
| 2022/0358904 | A1 * | 11/2022 | Mandel | G10L 13/047 |
| 2022/0415334 | A1 * | 12/2022 | Davidson | G01L 19/04 |
| 2023/0093174 | A1 * | 3/2023 | Huang | H04L 65/611 709/231 |
| 2023/0104270 | A1 * | 4/2023 | Wang | H04N 19/154 375/240.03 |
| 2023/0352036 | A1 * | 11/2023 | Kleijn | G10L 21/02 |
| 2023/0396537 | A1 * | 12/2023 | Kobayashi | H04L 45/38 |
| 2023/0396810 | A1 * | 12/2023 | Ge | G06V 10/82 |
| 2024/0007691 | A1 * | 1/2024 | Kawano | H04N 21/2402 |

FOREIGN PATENT DOCUMENTS

| | | |
|---|---|---|
| CN | 105610635 A | 5/2016 |
| CN | 109495660 A | 3/2019 |
| CN | 110767243 A | 2/2020 |
| CN | 110992963 A | 4/2020 |
| CN | 111243608 A | 6/2020 |
| CN | 111370032 A | 7/2020 |
| CN | 111429926 A | 7/2020 |
| CN | 111798858 A | 10/2020 |
| CN | 111862995 A | 10/2020 |
| CN | 112289328 A | 1/2021 |
| CN | 112767956 A | 5/2021 |
| JP | 4825944 B2 | 11/2011 |
| WO | WO 2009015944 A1 | 2/2009 |

OTHER PUBLICATIONS

Tencent Technology, IPRP, PCT/CN2022/081414, Oct. 10, 2023, 6 pgs.

(56) References Cited

OTHER PUBLICATIONS

Tencent Technology, Japanese Office Action, JP Patent Application No. 2023-538141, Jun. 3, 2024, 9 pgs.
Tencent Technology, Extended European Search Report, EP Patent Application No. 22783856.2, Jul. 22, 2024, 13 pgs.
Tencent Technology, ISR, PCT/CN2022/081414, May 26, 2022, 3 pgs.

* cited by examiner

AUDIO ENCODING METHOD, AUDIO DECODING METHOD, APPARATUS, COMPUTER DEVICE, STORAGE MEDIUM, AND COMPUTER PROGRAM PRODUCT

CROSS-REFERENCE TO RELATED APPLICATIONS

This application is a continuation application of PCT Patent Application No. PCT/CN2022/081414, entitled "AUDIO ENCODING METHOD, AUDIO DECODING METHOD, APPARATUS, COMPUTER EQUIPMENT, STORAGE MEDIUM AND COMPUTER PROGRAM PRODUCTS" filed on Mar. 17, 2022, which claims priority to Chinese Patent Application No. 202110380547.9, filed with the State Intellectual Property Office of the People's Republic of China on Apr. 9, 2021, and entitled "AUDIO ENCODING METHOD, AUDIO DECODING METHOD, APPARATUS, COMPUTER DEVICE, STORAGE MEDIUM, AND COMPUTER PROGRAM PRODUCT", all of which are incorporated herein by reference in their entirety.

FIELD OF THE TECHNOLOGY

This application relates to the field of audio and video technologies, and in particular, to an audio encoding method, an audio decoding method, an apparatus, a computer device, a computer-readable storage medium, and a computer program product.

BACKGROUND OF THE DISCLOSURE

The speech encoding technology is to perform redundancy analysis and compression on original lossless audio signals acquired in a time domain and a frequency domain through an audio model, so as to reduce speech transmission bandwidths and storage space, and maintain good audio quality. Input parameters of a speech encoder generally include: a sampling rate, a quantity of channels, an encoding bit rate, and the like. A larger encoding bit rate indicates more bandwidths occupied by encoding bit streams and greater storage space occupied by an encoding file, thereby having higher speech encoding quality.

In the related art, the encoding bit rate is generally set through an experimental experience value. For example, a method for perceptual evaluation of speech quality (PESQ) is used in a laboratory environment, to measure corresponding PESQ values under different encoding parameters, and perform matching according to the PESQ values and speech quality target requirements, so as to determine a required speech encoding bit rate. The speech encoding bit rate is used in actual services. In a whole process of speech encoding and compression, the encoding bit rate is usually fixed.

Obviously, for the speech encoding method using the fixed encoding bit rate in the related art, because speech signals are time-varying signals and compression processes of different speech signals in a speech encoder at different times vary greatly, the encoding quality of different speech signals under a same encoding bit rate varies greatly, so that the quality of speech encoding cannot be guaranteed.

SUMMARY

Embodiments of this application provide an audio encoding method, an audio decoding method, an apparatus, a computer device, a computer-readable storage medium, and a computer program product, which can improve the audio encoding quality. The technical solutions include the following aspects.

An embodiment of this application provides an audio encoding method, including:
 obtaining a sample audio feature parameter corresponding to each of sample audio frames in a first sample audio;
 performing encoding bit rate prediction on the sample audio feature parameter through an encoding bit rate prediction model, to obtain a sample encoding bit rate for each of the sample audio frames;
 performing audio encoding on the sample audio frames based on the corresponding sample encoding bit rates to generate sample audio data corresponding to the sample audio frames;
 performing audio decoding on the sample audio data, to obtain a second sample audio corresponding to the sample audio data; and
 training the encoding bit rate prediction model based on the first sample audio and the second sample audio until a sample encoding quality score reaches a target encoding quality score,
 the sample encoding quality score being determined through the first sample audio and the second sample audio.

An embodiment of this application provides an audio encoding method, including:
 obtaining an audio feature parameter corresponding to each of audio frames in an original audio;
 performing encoding bit rate prediction on the audio feature parameter through an encoding bit rate prediction model, to obtain an audio encoding bit rate for each of the audio frames, the encoding bit rate prediction model being configured to predict the audio encoding bit rate corresponding to each of the audio frames when a target encoding quality score is reached; and
 performing audio encoding on each of the audio frames based on the corresponding audio encoding bit rate, and generating target audio data based on an encoding result corresponding to each of the audio frames.

An embodiment of this application provides an audio decoding method, including:
 obtaining the encoded target audio data; and
 performing audio decoding on the encoded target audio data through an audio decoding bit rate corresponding to an audio encoding bit rate, to obtain decoded target audio data.

An embodiment of this application provides an audio encoding apparatus, including:
 a first obtaining module, configured to obtain a sample audio feature parameter corresponding to each of sample audio frames in a first sample audio;
 a first processing module, configured to perform encoding bit rate prediction on the sample audio feature parameter through an encoding bit rate prediction model, to obtain a sample encoding bit rate for each of the sample audio frames;
 a first encoding module, configured to perform audio encoding on the sample audio frames based on the corresponding sample encoding bit rates to generate sample audio data corresponding to the sample audio frames;
 an audio decoding module, configured to perform audio decoding on the sample audio data, to obtain a second sample audio corresponding to the sample audio data; and a training module, configured to train the encoding bit rate prediction model based on the first sample audio and the second sample audio until a sample encoding quality score reaches a target encoding quality score, the sample encoding quality score being determined through the first sample audio and the second sample audio.

An embodiment of this application provides an audio encoding apparatus, including:
- a fourth obtaining module, configured to obtain an audio feature parameter corresponding to each of audio frames in an original audio;
- a second processing module, configured to perform encoding bit rate prediction on the audio feature parameter through an encoding bit rate prediction model, to obtain an audio encoding bit rate of the audio frame, the encoding bit rate prediction model being configured to predict the audio encoding bit rate corresponding to each of the audio frames when a target encoding quality score is reached; and
- a second encoding module, configured to perform audio encoding on each of the audio frames based on the corresponding audio encoding bit rate, and generate target audio data based on an encoding result corresponding to each of the audio frames.

An embodiment of this application provides an audio decoding apparatus, including:
- a fifth obtaining module, configured to obtain encoded target audio data; and
- a decoding module, configured to perform audio decoding on the encoded target audio data through an audio decoding bit rate corresponding to an audio encoding bit rate, to obtain decoded target audio data.

An embodiment of this application provides a computer device, including a processor and a memory, the memory storing at least one program, the at least one program being loaded and executed by the processor and causing the computer device to implement the audio encoding method or the audio decoding method described in the foregoing aspects.

An embodiment of this application provides a non-transitory computer-readable storage medium, storing at least one program, the at least one program being loaded and executed by a processor of a computer device and causing the computer device to implement the audio encoding method or the audio decoding method described in the foregoing aspects.

An embodiment of this application provides a computer program product or a computer program, the computer program product or the computer program including computer instructions, the computer instructions being stored in a computer-readable storage medium. A processor of a computer device reads the computer instructions from the computer-readable storage medium, and executes the computer instructions, so that the computer device performs the audio encoding method or the audio decoding method described in the various implementations.

The technical solutions provided in the embodiments of this application may include the following beneficial effects:

In an audio encoding scenario, an audio feature parameter corresponding to each of audio frames in an original audio is analyzed to realize the objective of dynamically adjusting an audio encoding bit rate corresponding to the audio frame based on the audio feature parameter, which can determine the audio encoding bit rate matching the audio feature parameter for each of the audio frames, thereby improving the encoding quality of the whole audio. Compared with the use of a fixed encoding bit rate in the related art, by performing audio encoding by using a dynamic encoding bit rate, the audio encoding bit rate can be reduced as much as possible while the audio encoding quality meets target requirements, so that the storage space of audio data and bandwidth consumption in a process of audio data transmission can be reduced.

It is to be understood that the foregoing general descriptions and the following detailed descriptions are merely for illustration and explanation purposes and are not intended to limit this application.

BRIEF DESCRIPTION OF THE DRAWINGS

Accompanying drawings herein are incorporated into and constitute a part of this specification, show embodiments that conform to this application, and are used together with this specification to describe the principle of this application.

DESCRIPTION OF EMBODIMENTS

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The following implementations described in the following exemplary embodiments do not represent all implementations that are consistent with this application. Instead, they are merely examples of the apparatus and method according to some aspects of this application as recited in the appended claims.

For convenience of understanding, terms related in the embodiments of this application are introduced below.

1) Audio encoding: the audio encoding is to perform redundancy analysis and compression on original lossless audio signals originally acquired in a time domain and a frequency domain through an audio model, so as to reduce speech transmission bandwidths and storage space, and maintain good audio quality. Input parameters of an audio encoder include: a sampling rate, a quantity of channels, an encoding bit rate, and the like. A larger encoding bit rate used during audio encoding indicates higher speech encoding quality, more bandwidths occupied by encoding bit streams indicate, and greater storage space occupied by an audio file after audio encoding.

2) Artificial intelligence (AI): it is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. The AI is to study the design principles and implementation methods of various intelligent machines, to enable the machines to have the functions of perception, reasoning, and decision-making. Basic AI technologies generally include technologies such as a sensor, a dedicated AI chip, cloud computing, distributed storage, a big data processing technology, an operating/interaction system, and electromechanical integration. AI software technologies mainly include a computer vision technology, a speech processing technology, a natural language processing technology, machine learning/deep learning, and the like.

The embodiments of this application mainly relate to the machine learning technical field in the AI technical field.

Figure 1:
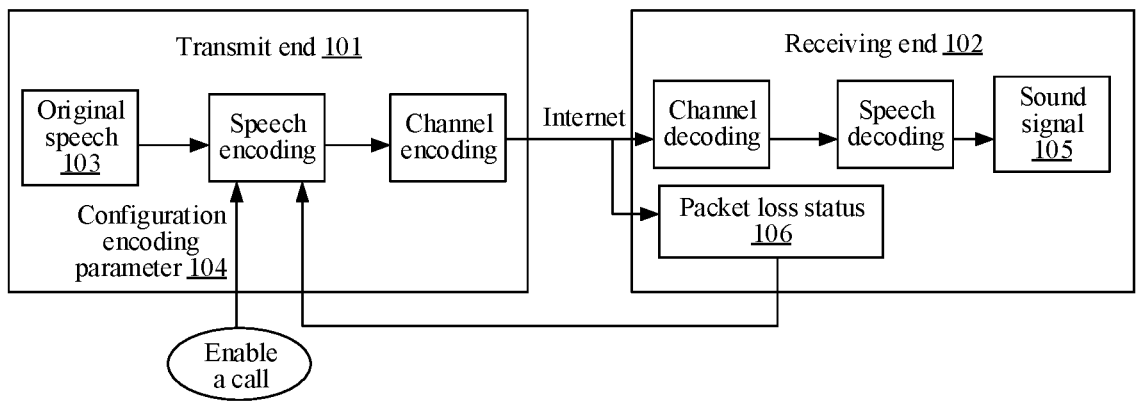
FIG. 1 shows a schematic diagram of a process of audio encoding in the related art.

FIG. 1 shows a schematic diagram of a process of audio encoding in the related art. By using audio encoding in a scenario of a speech call as an example, before the speech call is enabled, a fixed encoding parameter is often preset for an audio encoder based on an experimental experience value. When enabling the speech call, a transmit end 101 performs speech encoding and channel encoding on an acquired original speech 103 based on an encoding parameter 104 configured for the current speech scenario, and transmits an encoding result to a receiving end 102 via the Internet. The receiving end 102 performs channel decoding and speech decoding on the encoding result, to generate a corresponding sound signal 105. In the whole process of the speech call the encoding parameter (an encoding bit rate) is generally fixed, and is only appropriately adjusted according to a packet loss status 106.

Obviously, when an audio signal is encoded by using a fixed encoding bit rate, because speech signals are time-varying signals and compression processes of different speech signals in a speech encoder at different times vary greatly, the encoding quality of different speech signals under a same encoding bit rate varies greatly, so that the quality of speech encoding cannot be guaranteed.

Figure 2:
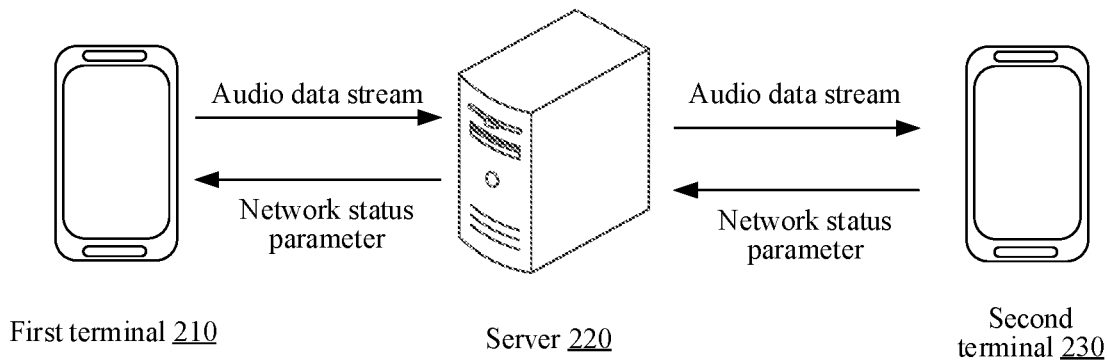
FIG. 2 shows a schematic diagram of an implementation environment according to an embodiment of this application.

For the problems in the related art, an embodiment of this application provides a method for dynamically adjusting an audio encoding bit rate based on an audio feature parameter (namely, an audio encoding method and an audio decoding method). FIG. 2 shows an implementation environment according to an embodiment of this application. The implementation environment may include: a first terminal 210, a server 220, and a second terminal 230.

An application supporting a network call method is installed and run on the first terminal 210. The first terminal may be an electronic device, such as a smartphone, a desktop computer, a panel computer, a multimedia playback device, a smart watch, a smart speaker, or a laptop. The application may be a social program, a live streaming program, a shopping program, a game program, a video program, an audio program, an instant messaging program, or the like.

In some embodiments, the first terminal 210 may store an encoding bit rate prediction model, and the encoding bit rate prediction model may dynamically adjust an audio encoding bit rate based on an audio feature parameter corresponding to an audio signal, perform audio encoding based on the predicted audio encoding bit rate, and push an encoded audio data stream to the second terminal 230 through the server 220. For example, when the encoded audio data needs to be transmitted through a network, to enable the audio data to be transmitted to a receiving end (such as, the second terminal 230) with better quality, a network status parameter fed back by the receiving end may be added when the encoding bit rate is predicted. For example, in specific scenarios (where the specific scenarios may be: a scenario of audio and video call, a scenario of live streaming, and the like), the encoded audio data needs to be transmitted to the receiving end through the network; and in other possible application scenarios, the encoded audio data does not need to be transmitted through the network, and only needs to be stored in a local or another storage medium. Correspondingly, the network status parameter does not need to be considered when the audio encoding bit rate is predicted.

The encoding bit rate prediction model pre-stored in the first terminal 210 may be trained by another computer device (not shown in the figure), and the encoding bit rate prediction model is pushed to the first terminal 210, so that the first terminal 210 can realize the objective of dynamically adjusting the audio encoding bit rate based on the encoding bit rate prediction model in an actual application process. For example, the computer device may be a back-end server corresponding to the application in the first terminal 210.

The first terminal 210 and the server 220 may be connected to each other by using a wireless network or a wired network.

The server 220 is configured to provide a back-end service to the application (for example, an application that can perform a network call) in the first terminal 210 or the second terminal 230. For example, the server 220 may be a back-end server of the application. The server 220 may be one server; may be a server cluster including a plurality of servers, where the plurality of servers may form a blockchain, and the servers are nodes on the blockchain; or may be a cloud computing service center. In this embodiment of this application, the server 220 may receive an audio data stream from the first terminal 210, and push the audio data stream to the indicated second terminal 230. For example, the server 220 may receive a network status parameter fed back by the second terminal 230, and return the network status parameter to the first terminal 210, so that the first terminal 210 adjusts the audio encoding bit rate based on the network status parameter.

The second terminal 230 and the server 220 may be connected to each other by using a wireless network or a wired network.

An application supporting a network call method is installed and run on the second terminal 230. The first terminal may be an electronic device, such as a smartphone, a desktop computer, a panel computer, a multimedia playback device, a smart watch, a smart speaker, or a laptop. The application may be a social program, a live streaming program, a shopping program, a game program, a video program, an audio program, an instant messaging program, or the like. In this embodiment, the second terminal 230 may receive the audio data stream transmitted by the first terminal 210, and decode the audio data stream, to present the transmitted audio. For example, the second terminal 230 may return the network status parameter to the first terminal 210, so that the first terminal 210 can dynamically adjust the audio encoding bit rate based on the network status parameter. For example, in specific scenarios (where the specific scenarios may be: a scenario of audio and video call, a scenario of live streaming, and the like), the encoded audio data needs to be transmitted to the receiving end through the network; and in other possible application scenarios, the encoded audio data does not need to be transmitted through the network, and only needs to be stored in a local or another storage medium. Correspondingly, the network status parameter does not need to be considered when the audio encoding bit rate is predicted.

The audio in this embodiment of this application is not limited to a call audio, and may also be a recording, a live audio, or the like. The above terminals may include various types of applications, such as an instant messaging application, a video playback application, a recording application, a live streaming application, and the like.

In some embodiments, the above audio encoding method and audio decoding method may be applied to, but are not limited to, scenarios of cloud games, speech calls, and video live streaming.

Figure 3:
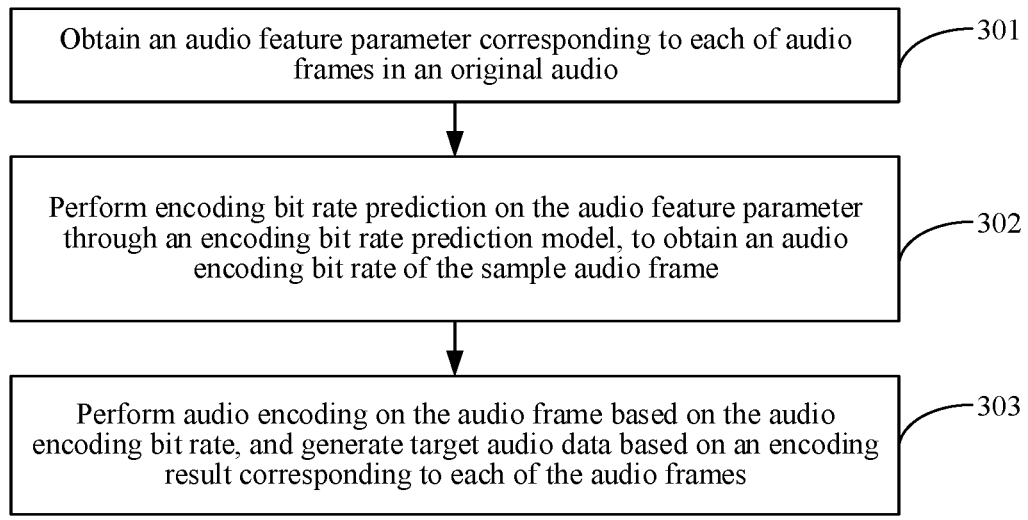
FIG. 3 shows a flowchart of an audio encoding method according to an embodiment of this application.

FIG. 3 shows a flowchart of an audio encoding method according to an embodiment of this application. This embodiment of this application is described by using an example in which the method is applied to the first terminal 210 shown in FIG. 2. The method includes the following steps.

Step 301. Obtain an audio feature parameter corresponding to each of audio frames in an original audio.

The original audio may be a speech acquired by the terminal. Exemplarily, the original audio may be a sound signal acquired in a network speech call scenario or a video call scenario, may be a sound signal acquired in a live streaming scenario, may be a sound signal acquired in an online karaoke scenario, or may be a sound signal acquired in a speech broadcast scenario. For example, the original audio may also be an audio obtained in a speech storage scenario. Exemplarily, the original audio may be a speech, music, a video, or the like. The form of the original audio is not limited in this embodiment of this application.

To make the audio easier to store and transmit over a long distance, audio encoding usually needs to be performed on the acquired original audio to reduce the audio storage space or reduce traffic bandwidths consumed by long-distance transmission. In the related art, in the process of audio encoding, an audio encoding bit rate applicable in different application scenarios is generally obtained through preliminary measurement, so that in an actual application process, obtained original audios are encoded by using the audio encoding bit rate, that is, a fixed encoding bit rate is used for all audios in a specific application scenario. By using the speech signal as an example, the speech signal is a time-varying signal. If different speech signals are encoded by using a fixed encoding bit rate, the compression quality of different speech signals in an audio encoder at different times obviously varies greatly, so that the quality of speech encoding cannot be guaranteed.

In this embodiment of this application, considering a feature (variability) of an audio signal, to improve the audio encoding quality, in a possible implementation, an audio feature parameter corresponding to each of audio frames in a same original audio is analyzed, so that an audio encoding bit rate corresponding to each of the audio frames is respectively predicted based on the audio feature parameter, so that the audio encoding bit rate can be dynamically adjusted based on different audio feature parameters, and each of the audio frames can meet encoding quality requirements, thereby improving the encoding quality of the original audio.

For example, when audio frame division is performed on the original audio, the division may be performed according to a set duration. Exemplarily, 20 ms is one audio frame.

For example, the audio feature parameter may include a fixed gain, an adaptive gain, a pitch period, a line spectrum pair parameter, and the like. The fixed gain, the adaptive gain, the pitch period, and the line spectrum pair parameter are not limited in this embodiment of this application.

The pitch period is used for reflecting a time interval between two consecutive times of opening and closing of glottis or a frequency of opening and closing of the glottis. Exemplarily, when a person produces a sound, vocal cords vibrate to produce a voiced sound (an unvoiced sound is produced by air friction). A pronunciation process of the voiced sound is that: an airflow from lungs impacts a glottis, and causes the glottis to open and close, forming a series of quasi-periodic airflow pulses, which go through the resonance of a vocal tract (including an oral cavity and a nasal cavity) and the radiation of lips and teeth, and finally form a speech signal. Therefore, a waveform of the voiced sound presents certain quasi-periodicity, and the pitch period refers to the quasi-periodicity. For example, when a pitch period corresponding to an audio signal is extracted, an autocorrelation method, a cepstrum method, an average amplitude difference function method, a linear prediction method, a wavelet-autocorrelation function method, a spectral subtraction-autocorrelation function method, or the like may be used. Exemplarily, the voiced sound generally requires a higher encoding bit rate (where the encoding bit rate is greater than a voiced sound bit rate threshold), while the unvoiced sound requires a lower encoding bit rate (where the encoding bit rate is greater than an unvoiced bit rate threshold). Therefore, for different speech signals, encoding bit rates that need to be used to make the audio signals reach preset encoding quality are also different. Correspondingly, in a process of training an encoding bit rate prediction model, a pitch period corresponding to an audio frame is extracted, and an encoding bit rate that needs to be used by the audio frame corresponding to the pitch period is further analyzed.

Because an original audio acquired by a mobile phone and another device often has low loudness and sometimes high loudness, causing the sound to be loud or small, and affecting the subjective feeling of audiences. Therefore, in a process of audio encoding, an input sound needs to be adjusted positively or negatively, so that an output sound is suitable for the subjective feeling of human ears. This process is a gain control process of the original audio, and adaptive gains corresponding to a speech signal at different times vary due to a difference in loudness. In a process of gaining an audio frame, a noise signal in an audio signal also be increased. An essence of audio encoding is to reduce the redundancy (namely, the noise signal) in an audio. Obviously, different gains affect an encoding bit rate of the audio signal. Therefore, the encoding bit rate corresponding to the audio signal needs to be determined based on gains corresponding to different audio frames.

The line spectrum pair parameter is used for reflecting a spectral feature of an audio signal, and the line spectrum pair parameter has relative independence of error, that is, a line spectrum pair parameter deviation at a frequency point only affects a speech frequency spectrum near the frequency, and has little influence on line spectrum pair parameter speech frequency spectra at other frequencies. In this way, the quantization and interpolation of the line spectrum pair parameter are achieved, and an encoded audio of same quality is achieved with a relatively small encoding bit rate. It can be seen that the line spectrum pair parameter corresponding to the audio signal is helpful for the determination of the encoding bit rate.

For example, a corresponding audio feature extraction model may be set. The original audio is inputted into the audio feature extraction model, and audio feature extraction is performed on each of the audio frames included in the original audio, thereby outputting the audio feature parameter corresponding to each of the audio frames.

For example, because the audio feature parameter includes many feature dimensions, to improve the efficiency of audio feature extraction, feature parameters on N types of audio feature dimensions that have a greater influence on an encoding result (where the influence of the encoding result is greater than an influence threshold) may be selected. Correspondingly, only the audio feature parameters on the N types of audio feature dimensions need to be extracted, where N is a positive integer. For example, different audio feature extraction dimensions may be set for different audio types.

Step 302. Perform encoding bit rate prediction on the audio feature parameter through an encoding bit rate prediction model, to obtain an audio encoding bit rate of the sample audio frame.

The encoding bit rate prediction model is trained with a target encoding quality score as a target. Therefore, in a process of applying the encoding bit rate prediction model to perform encoding bit rate prediction, based on the audio feature parameter corresponding to each of the audio frames, the audio encoding bit rate corresponding to each of the audio frames when audio encoding quality corresponding to the original audio reaches the target encoding quality score can be predicted. Different audio feature parameters correspond to different audio encoding bit rates.

An encoding bit rate prediction model is set in a terminal, and the encoding bit rate prediction model may dynamically adjust the audio encoding bit rate corresponding to each of the audio frames based on the audio feature parameter corresponding to each of the audio frames. The audio feature parameter corresponding to each of the audio frames is inputted into the encoding bit rate prediction model, to obtain the audio encoding bit rate corresponding to each of the audio frames, so that audio encoding can be performed on the audio frame based on the audio encoding bit rate.

Exemplarily, for the process of training the encoding bit rate prediction model, reference may be made to the following embodiments. Details are not described in this embodiment of this application.

Step 303. Perform audio encoding on the audio frame based on the audio encoding bit rate, and generate target audio data based on an encoding result corresponding to each of the audio frames.

In some embodiments, after audio encoding bit rates corresponding to different audio frames are obtained, the audio frames may be encoded based on the audio encoding bit rates, so as to generate the target audio data corresponding to the original audio combined with the encoding results corresponding to the audio frames.

Exemplarily, if the original audio is divided into an audio frame 1 to an audio frame 50, correspondingly, audio feature parameters corresponding to the audio frames are an audio feature parameter 1 to an audio feature parameter 50. The audio feature parameters corresponding to the audio frames are respectively inputted into the encoding bit rate prediction model to obtain encoding bit rates corresponding to the audio frames (namely, an encoding bit rate 1 to an encoding bit rate 50), and then audio encoding is performed on the audio frames based on the audio encoding bit rates corresponding to the audio frames to obtain audio encoding results corresponding to the audio frames (namely, an audio encoding result 1 to an audio encoding result 50), thereby combining the audio encoding result 1 to the audio encoding result 50 to obtain the target audio data corresponding to the original audio.

The audio encoding method in this embodiment of this application may be pulse code modulation (PCM) encoding, waveform sound file (WAV) encoding, MP3 encoding, and the like.

For example, the target audio data may be stored in the terminal, and may also be transmitted to other devices through a network. For example, in specific scenarios (such as, a scenario of audio and video call, and a scenario of live streaming), the encoded target audio data needs to be transmitted to a receiving end through the network. The receiving end performs audio decoding on the target audio data by using audio decoding bit rates corresponding to the audio encoding bit rates to obtain decoded target audio data, so as to play the decoded target audio data losslessly.

For example, for a same original audio, if audio feature differences between several consecutive audio frames are generally small, differences between corresponding audio encoding bit rates are also small or a same audio encoding bit rate is generally corresponded. To prevent accidental errors of the encoding bit rate prediction model from affecting the audio encoding results, and the audio encoding bit rate corresponding to each of the obtained audio frames may be smoothed to reduce the influence of the prediction errors on the audio encoding quality.

In summary, in this embodiment of this application, an audio feature parameter corresponding to each of audio frames in an original audio is analyzed to realize the objective of dynamically adjusting an audio encoding bit rate corresponding to the audio frame based on the audio feature parameter, which can determine the audio encoding bit rate matching the audio feature parameter for each of the audio frames, thereby improving the encoding quality of the whole audio. Compared with the use of a fixed encoding bit rate in the related art, by performing audio encoding by using a dynamic encoding bit rate in this embodiment of this application, the audio encoding bit rate can be reduced as much as possible while the audio encoding quality meets target requirements, so that the storage space of audio data and bandwidth consumption in a process of audio data transmission can be reduced.

To ensure that the encoding bit rate prediction model can achieve the target of dynamically adjusting the audio encoding bit rate, the encoding bit rate prediction model needs to be pre-trained through a large quantity of sample audios, so that the encoding bit rate prediction model can learn audio encoding bit rates applicable to audios corresponding to different audio feature parameters, so that the audio encoding bit rates can be dynamically adjusted based on the encoding bit rate prediction model in an application process.

Figure 4:
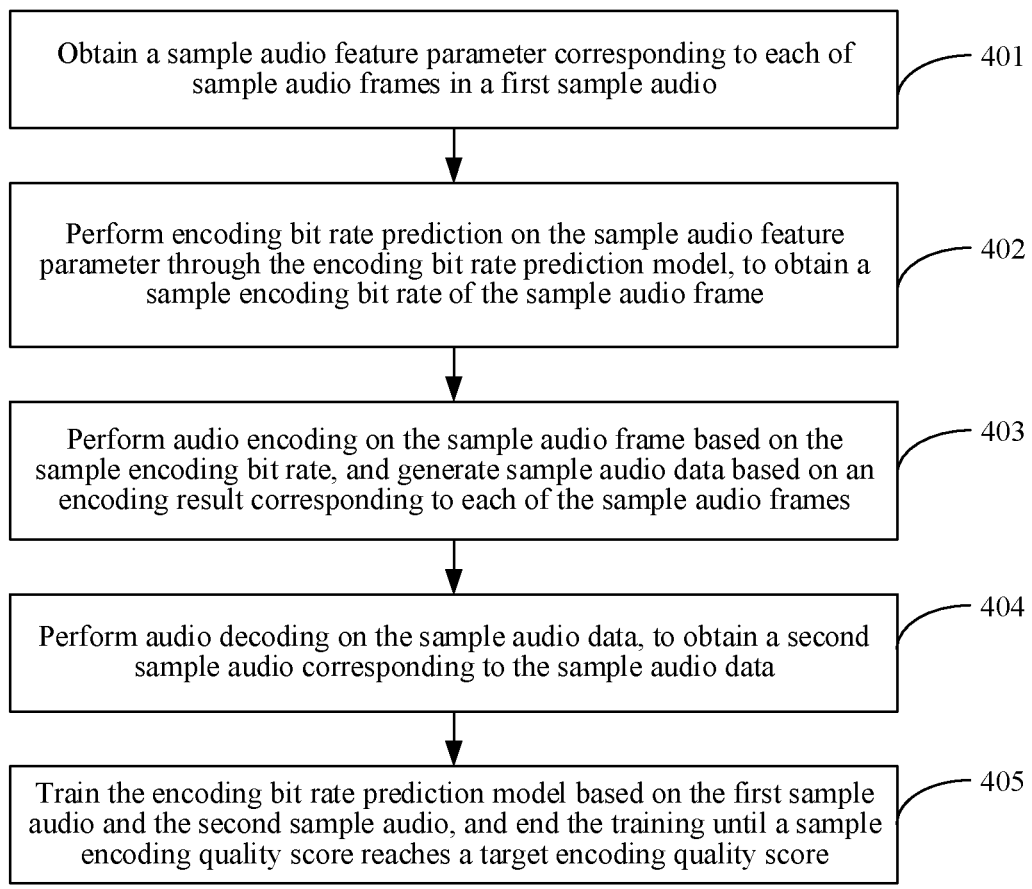
FIG. 4 shows a flowchart of an audio encoding method according to an embodiment of this application.

FIG. 4 shows a flowchart of an audio encoding method according to an embodiment of this application. This embodiment of this application is described by using a computer device as an example. The method includes the following steps.

Step 401. Obtain a sample audio feature parameter corresponding to each of sample audio frames in a first sample audio.

An encoding bit rate prediction model is configured to match audio encoding bit rates corresponding to different audio feature parameters. In a process of training the encoding bit rate prediction model, a larger quantity of sample audios and a sample audio feature parameter corresponding to each of sample audio frames in each of the sample audios need to be obtained for training the encoding bit rate prediction model.

For example, the sample audio feature parameter may be extracted through an audio feature extraction model.

For example, to make the encoding bit rate prediction model applicable to more application scenarios, when obtaining the first sample audio, different types of audios may be obtained, such as a speech, music, an audio in audio and video, and the like.

Exemplarily, more first sample audios indicate higher prediction accuracy of the encoding bit rate prediction model; and more types of the first sample audios also indicate a higher prediction range and higher prediction accuracy of the encoding bit rate prediction model.

For example, when selecting the first sample audio frames, in addition to different types of audios, for a same type of audios, sample audios with different audio content and different audio durations may also be selected. For a same sample audio, the first sample audio may also be divided into different audio frames for subsequent extraction of audio feature parameters.

Step 402. Perform encoding bit rate prediction on the sample audio feature parameter through the encoding bit rate prediction model, to obtain a sample encoding bit rate of the sample audio frame.

In some embodiments, after the sample audio feature parameter corresponding to each of the sample audio frames is inputted into the encoding bit rate prediction model, the sample encoding bit rate corresponding to each of the sample audio frames outputted by the encoding bit rate prediction model may be obtained.

For example, the encoding bit rate prediction model may use a fully connected network as a main network, or may use a deep neural network (DNN), a convolutional neural network (CNN), a recurrent neural network (RNN), and other neural networks. Alternatively, developers build a neural network based on actual requirements. A structure of the encoding bit rate prediction model is not limited in this embodiment of this application. Different sample audio feature parameters correspond to different sample encoding bit rates.

Step 403. Perform audio encoding on the sample audio frame based on the sample encoding bit rate, and generate sample audio data based on an encoding result corresponding to each of the sample audio frames.

Because the sample encoding bit rate or audio encoding bit rate outputted by the encoding bit rate prediction model corresponds to the audio encoding scenario, correspondingly, when evaluating whether an encoding bit rate outputted by the encoding bit rate prediction model matches an audio frame, the audio encoding result needs to be used as one basis for training the encoding bit rate prediction model after audio encoding is performed on the sample audio frame by using the sample encoding bit rate.

In some embodiments, for a first sample audio, a sample encoding bit rate corresponding to each of sample audio frames in the first sample audio is obtained, and audio encoding is performed on each of the sample audio frames based on the sample encoding bit rate corresponding to each of the sample audio frames, so as to generate sample audio data based on an encoding result corresponding to each of the sample audio frames, which is used for subsequent evaluation of the current speech encoding quality corresponding to the first sample audio.

Step 404. Perform audio decoding on the sample audio data, to obtain a second sample audio corresponding to the sample audio data.

To evaluate the speech encoding quality, audio decoding is performed on the sample audio data to obtain a second sample audio generated based on the sample audio data, so that the audio encoding quality of the first sample audio can be determined by comparing the second sample audio with the original sample audio.

Step 405. Train the encoding bit rate prediction model based on the first sample audio and the second sample audio, and end the training until a sample encoding quality score reaches a target encoding quality score.

The sample encoding quality score is determined through the first sample audio and the second sample audio.

In some embodiments, by comparing the original audio (the first sample audio) with an audio after audio encoding and decoding (the second sample audio), encoding quality corresponding to the current encoding parameter is determined, so that various parameters pf the encoding bit rate prediction model are adjusted based on the encoding quality, and then the process of training the encoding bit rate prediction model is completed through several training periods.

In the process of training the encoding bit rate prediction model, when the sample encoding quality score of the sample audio can reach the target encoding quality score after audio encoding is performed on the sample audio by using the encoding bit rate outputted by the encoding bit rate prediction model, it is determined that the training of the encoding bit rate prediction model is completed. Exemplarily, the target encoding quality score may be 5 scores. For example, the target encoding quality score corresponding to the encoding bit rate prediction model may also be set based on actual application scenario requirements.

For a manner of determining the sample encoding quality, a PESQ testing method may be used to calculate a difference value corresponding to the first sample audio and the second sample audio, and then map the difference value to a mean opinion score (MOS) value. A greater difference between the first sample audio and the second sample audio indicates worse corresponding speech encoding quality and a lower MOS value.

In summary, in this embodiment of this application, by training an encoding bit rate prediction model, the encoding bit rate prediction model can dynamically adjust an audio encoding bit rate based on a sample audio feature parameter corresponding to a sample audio frame. In this way, in an actual application process, the audio encoding bit rate predicted based on the encoding bit rate prediction model is more in line with features of an audio signal, and the audio encoding bit rate can be reduced as much as possible while the audio encoding quality meets target requirements, so that the storage space of audio data and bandwidth consumption in a process of audio data transmission can be reduced.

Although a segment of audio varies at different times, a difference between consecutive audio frames is small, that is to say, an audio feature parameter difference between adjacent audio frames is small, and an audio encoding bit rate corresponding to a previous audio frame has a certain reference for a current audio frame when an audio encoding bit rate corresponding to the current audio frame is predicted. To further improve the prediction accuracy of the audio encoding bit rate, the audio encoding bit rate corresponding to the previous audio frame may be returned to a process of predicting an encoding bit rate of next audio frame.

Figure 5:
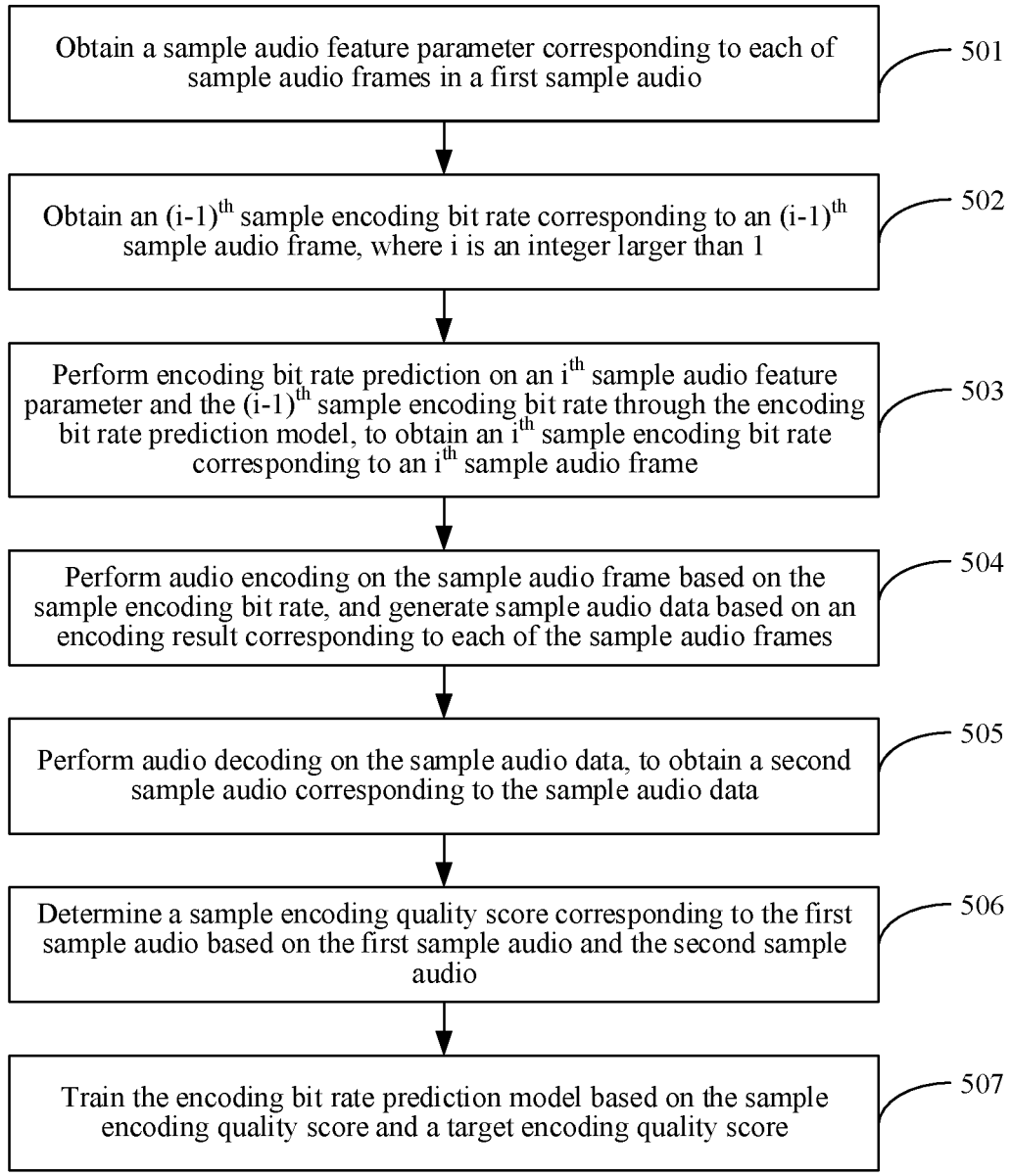
FIG. 5 shows a flowchart of an audio encoding method according to an embodiment of this application.

FIG. 5 shows a flowchart of an audio encoding method according to an embodiment of this application. This embodiment of this application is described by using a computer device as an example. The method includes the following steps.

Step 501. Obtain a sample audio feature parameter corresponding to each of sample audio frames in a first sample audio.

For the implementation of step 501, reference may be made to step 401, and details are not described again in this embodiment of this application.

For example, a type of the sample audio feature parameter may include at least one of a fixed gain, an adaptive gain, a pitch period, a pitch frequency, or a line spectrum pair parameter.

Step 502. Obtain an $(i-1)^{th}$ sample encoding bit rate corresponding to an $(i-1)^{th}$ sample audio frame.

i is an increasing integer and a value range thereof is $1<i\leq N$, N is a quantity of the sample audio frames, and N is an integer larger than 1.

In some embodiments, by returning a sample encoding bit rate corresponding to a previous sample audio frame to an encoding bit rate prediction model, reference can be made to the previous frame sample encoding bit rate when a sample encoding bit rate corresponding to next sample audio frame is predicted, so that a situation of great fluctuation of the sample encoding bit rate can be avoided as much as possible.

Step 503. Perform encoding bit rate prediction on an $i^{th}$ sample audio feature parameter and the $(i-1)^{th}$ sample encoding bit rate through the encoding bit rate prediction model, to obtain an $i^{th}$ sample encoding bit rate corresponding to an $i^{th}$ sample audio frame.

In some embodiments, when the $i^{th}$ sample encoding bit rate corresponding to the $i^{th}$ sample audio frame is predicted, both the obtained $(i-1)^{th}$ sample encoding bit rate and $i^{th}$ sample audio feature parameter may be inputted into the encoding bit rate prediction model to provide a prediction basis for the $i^{th}$ sample encoding bit rate, so that the prediction accuracy of the encoding bit rate can be further improved.

Exemplarily, if the first sample audio is divided into a sample audio frame 1 to a sample audio frame 60, correspondingly, in a process of encoding bit rate prediction, when the encoding bit rate prediction model outputs a tenth sample encoding bit rate corresponding to a tenth sample audio frame to predict an eleventh sample encoding bit rate corresponding to an eleventh sample audio frame, the tenth sample encoding bit rate and an eleventh sample audio feature parameter may be inputted into the encoding bit rate prediction model to obtain the eleventh sample encoding bit rate.

Step 504. Perform audio encoding on the sample audio frame based on the sample encoding bit rate, and generate sample audio data based on an encoding result corresponding to each of the sample audio frames.

Step 505. Perform audio decoding on the sample audio data, to obtain a second sample audio corresponding to the sample audio data.

For the implementations of step 504 and step 505, reference may be made to the foregoing embodiments, and details are not described again in this embodiment of this application.

Step 506. Determine a sample encoding quality score corresponding to the first sample audio based on the first sample audio and the second sample audio.

In some embodiments, PESQ testing is performed on the first sample audio and the second sample audio, a testing result is mapped to a MOS value, and the MOS value is determined as the sample encoding quality score corresponding to the first sample audio.

Exemplarily, a value range of the MOS value may be 0 to 5, where a larger MOS value indicates better audio encoding quality.

Step 507. Train the encoding bit rate prediction model based on the sample encoding quality score and a target encoding quality score.

The target encoding quality score indicates an expected target of audio encoding and is set by developers. Different target encoding quality scores may be set based on application scenarios of the encoding bit rate prediction model. Exemplarily, if the encoding bit rate prediction model is applicable to a speech call scenario, the target encoding quality score may be set as 4. If the encoding bit rate prediction model is applicable to an audio storage scenario, the target encoding quality score may be set as 5.

For example, different encoding bit rate prediction models may also be trained for different target encoding quality scores, so that in an actual application process, a corresponding encoding bit rate prediction model can be selected based on requirements of an actual application scenario for the target encoding quality score.

In some embodiments, by comparing the sample encoding quality score with the target encoding quality score, a difference between a current encoding result and an expected result is determined, so as to train the encoding bit rate prediction model based on the audio difference, to update various parameters in the encoding bit rate prediction model.

In the process of audio encoding, in addition to the target encoding quality score, the selection of the encoding bit rate is also to be used as one of indicators for evaluating the encoding quality. Exemplarily, for a same audio signal, if both an encoding bit rate A and an encoding bit rate B can achieve same encoding quality, but the encoding bit rate A is smaller than the encoding bit rate B and a larger encoding bit rate indicates that more storage space and traffic bandwidths may be consumed, a smaller encoding bit rate needs to be determined from the encoding bit rate A and the encoding bit rate B. Correspondingly, in the model training process, the encoding bit rate is also used as one of loss parameters of the encoding bit rate prediction model.

Exemplarily, the process of training the encoding bit rate prediction model may also include the following steps.

I. Determine an average encoding bit rate corresponding to the first sample audio, where the average encoding bit rate is determined through the sample encoding bit rates corresponding to the sample audio frames.

In this embodiment of this application, in the process of audio encoding, the sample encoding bit rate corresponding to each of the sample audio frames is predicted, and when evaluating whether to reach a smaller sample encoding bit rate, the sample encoding bit rates corresponding to the sample audio frames may be averaged, to obtain the average encoding bit rate, so as to determine the average encoding bit rate as one of parameters for evaluating the audio encoding quality.

II. Construct a first encoding loss corresponding to the first sample audio based on the average encoding bit rate, the sample encoding quality score, and the target encoding quality score.

In some embodiments, two parameter dimensions, namely, the encoding bit rate and the encoding quality score, are synthesized to jointly evaluate the encoding loss corresponding to the first sample audio, that is, the first encoding loss corresponding to the first sample audio is calculated based on the average encoding bit rate, the sample encoding quality score, and the target encoding quality score.

For example, developers may adjust weights of the two parameter dimensions based on requirements of the application scenario. Exemplarily, for the speech call scenario, a larger weight may be set for the encoding bit rate; and for the audio storage scenario, a larger weight may be set for the encoding quality score.

Exemplarily, the process of constructing the first encoding loss may also include the following steps.

1. Obtain a first loss weight corresponding to the average encoding bit rate and a second loss weight corresponding to an encoding quality score, where the encoding quality score is determined through the sample encoding quality score and the target encoding quality score.

In some embodiments, when the encoding loss is calculated, the loss weights corresponding to the average encoding bit rate and the encoding quality score may be respectively obtained, so as to calculate the first encoding loss based on the loss weights corresponding to the parameters.

For example, the first loss weight and the second loss weight are set by the developers. Different first loss weights and second loss weights may be respectively set based on different application scenarios of the encoding bit rate prediction model, so that the trained encoding bit rate prediction model is more applicable to requirements of the application scenarios.

For example, different encoding bit rate prediction models may also be trained for different loss weight combinations, so that in an actual application process, corresponding encoding bit rate prediction models can be selected for requirements of different actual application scenarios.

2. Construct the first encoding loss corresponding to the first sample audio based on the average encoding bit rate, the first loss weight, the encoding quality score, and the second loss weight.

Exemplarily, a formula of calculating the first encoding loss may be represented as follows:

$$a * \text{average}(\text{bitrate}) + (1-a) * \text{power}(f(\text{MOS\_SET} - mos), 3)$$

$$f(\text{MOS\_SET} - mos) = \begin{cases} 0 & , \text{MOS\_SET} - mos \leq 0 \\ \text{MOS\_SET} - mos & , \text{MOS\_SET} - mos > 0 \end{cases}$$

where, a represents a weighted coefficient of 0 to 1 (namely, a loss weight); average(.) represents an average function; bitrate represents an encoding bit rate; power(.) represents a power function; MOS_SET represents a preset target value of a speech objective quality (MOS) score (namely, a target encoding quality score); mos represents the sample encoding quality score; and a function f(x) is defined as that, when x<=0, f(x)=0; and when x>0, f(x)=x.

In some embodiments, the average encoding bit rate, the first loss weight, the sample encoding quality score, the target encoding quality score, and the second loss weight are substituted into the above formula, so that the first encoding loss corresponding to the first sample audio can be calculated.

III. Train the encoding bit rate prediction model based on the first encoding loss and a preset encoding loss.

In some embodiments, in the process of training the encoding bit rate prediction model, a cross-entropy criterion is used, that is, the preset encoding loss is preset, and it may be determined that the training of the encoding bit rate prediction model is completed only when the first encoding loss is infinitely close to the preset encoding loss.

In some embodiments, by returning a previous frame sample encoding bit rate to the encoding bit rate prediction model, a reference value may be provided for prediction of next frame sample encoding bit rate, so that great fluctuation of the encoding bit rate in the prediction process is avoided, and the prediction accuracy of the encoding bit rate can be improved. In addition, a small encoding bit rate and good encoding quality are used as a target to train the encoding bit rate prediction model, so that when the encoding bit rate prediction model controls a speech encoding bit rate in an application process, the encoding bit rate is smallest on a premise that speech encoding quality meets target requirements. Correspondingly, the audio encoding quality can be best under a condition of same bandwidths or same storage space.

In a specific application scenario, audio data after audio encoding needs to be transmitted to another terminal through a network. For example, in a speech call scenario, encoded speech data needs to be transmitted to another client, and whether a receiving end can obtain a good audio signal depends not only on the encoding bit rate, but also on a network environment status of a network transmission process. Therefore, to ensure that the receiving end can obtain a high-quality audio signal in this specific scenario, a current network status parameter needs to be considered in the process of predicting the audio encoding bit rate. Correspondingly, in the model training process, the network status parameter also needs to participate in the model training.

Figure 6:
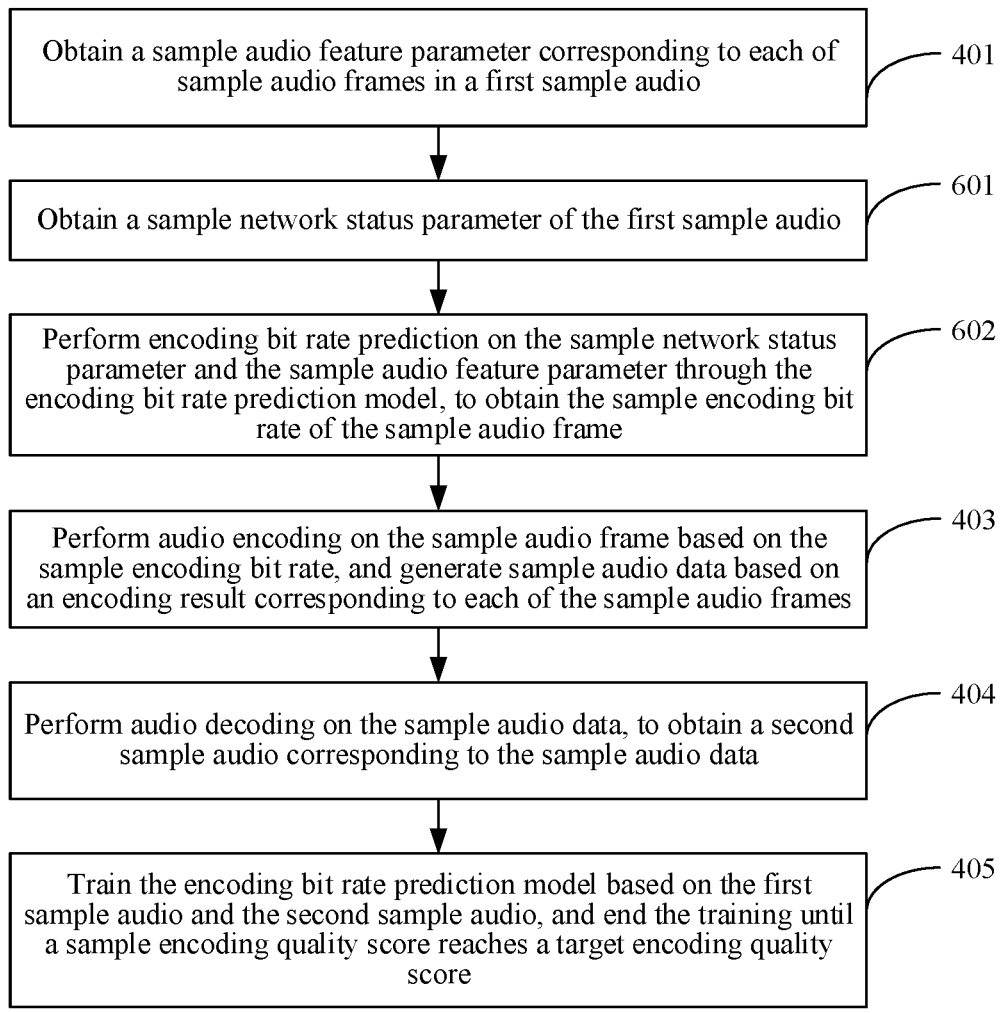
FIG. 6 shows a flowchart of an audio encoding method according to an embodiment of this application.

Exemplarily, based on FIG. 4, as shown in FIG. 6, step 402 may be replaced with step 601 and step 602.

Step 601. Obtain a sample network status parameter of the first sample audio.

When the encoding bit rate prediction model is trained, to make the predicted audio encoding bit rate applicable to a current network status, a network status parameter may also be added to training samples for training the encoding bit rate prediction model. Exemplarily, the sample network status parameter may be a packet loss rate, a network transmission rate, or the like.

For example, the required sample network status parameter may be simulated randomly. Exemplarily, different sample network status parameters may be generated for different sample audios, or corresponding sample network status parameters are generated for different sample audio frames, or a corresponding sample network status parameter is generated every one preset time period.

Correspondingly, when a sample encoding bit rate corresponding to a sample audio frame is predicted, a sample network status parameter and a sample audio feature parameter corresponding to the sample audio frame are jointly inputted into the encoding bit rate prediction model for prediction of the encoding bit rate.

Step 602. Perform encoding bit rate prediction on the sample network status parameter and the sample audio feature parameter through the encoding bit rate prediction model, to obtain the sample encoding bit rate of the sample audio frame.

In some embodiments, when the sample encoding bit rate corresponding to the sample audio frame is predicted, in addition to the sample audio feature parameter corresponding to the sample audio frame, the sample network status parameter used in the current prediction also needs to be obtained, and the sample network status parameter and the sample audio feature parameter are jointly inputted into the encoding bit rate prediction model, so as to obtain the sample encoding bit rate outputted by the encoding bit rate prediction model.

For example, to further improve the accuracy of encoding prediction in a specific application scenario, in the process of encoding bit rate prediction, a sample encoding bit rate corresponding to a previous sample audio frame may also be returned to the encoding bit rate prediction model, so as to provide a reference for prediction of a sample encoding bit rate corresponding to next sample audio frame.

In some embodiments, the sample network status parameter, an $(i-1)^{th}$ sample encoding bit rate (an encoding bit rate corresponding to an $(i-1)^{th}$ sample audio frame), and an $i^{th}$ sample audio feature parameter may be inputted into the encoding bit rate prediction model, where the sample network status parameter provides a current network status reference, and the $(i-1)^{th}$ sample encoding bit rate provides an encoding bit rate prediction reference, so that an $i^{th}$ sample encoding bit rate corresponding to an $i^{th}$ sample audio frame is generated.

In some embodiments, by adding the network status parameter in the training process, the encoding bit rate prediction model can consider an influence of a network status on the encoding bit rate during encoding bit rate prediction, thereby further improving the audio encoding quality corresponding to a specific scenario (such as, a speech call scenario).

Figure 7:
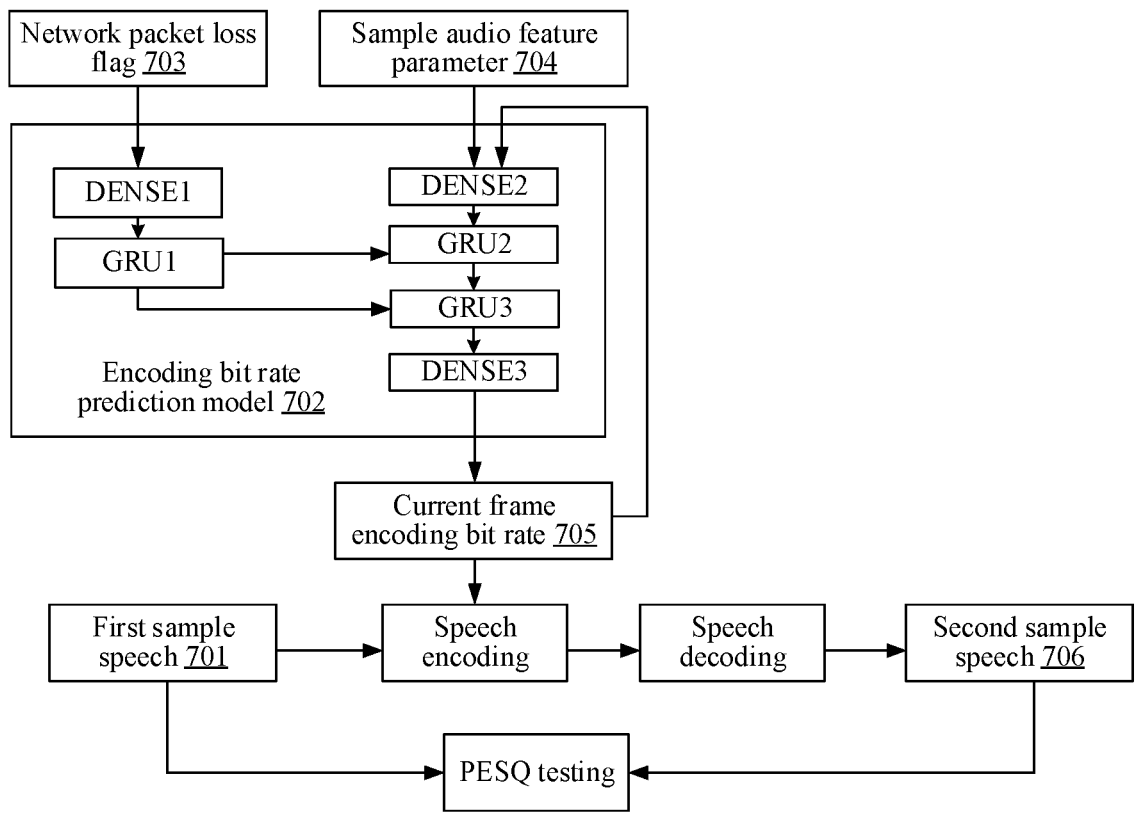
FIG. 7 shows a schematic diagram of a complete model training process according to an embodiment of this application.

FIG. 7 shows a schematic diagram of a complete model training process according to an embodiment of this application. In a process of training an encoding bit rate prediction model 702 based on a first sample speech 701, the first sample speech 701 is divided into several sample audio frames, and a sample audio feature parameter 704 and a network packet loss flag 703 corresponding to each of the sample audio frames are inputted into the encoding bit rate prediction model 702, to obtain a current frame encoding bit rate 705 outputted by the encoding bit rate prediction model 702. The current frame encoding bit rate 705 is not only used for speech encoding, but also for predicting next frame encoding bit rate after the current frame encoding bit rate 705 is returned to the encoding bit rate prediction model 702. Audio encoding is performed based on an encoding bit rate corresponding to each of the sample audio frames to obtain an audio encoding result, and a second sample speech 706 is generated after audio decoding is performed on the speech encoding result, so that PESQ testing is performed on the first sample speech 701 and the second sample speech 706, and the encoding bit rate prediction model 702 is trained based on a test result.

Exemplarily, the encoding bit rate prediction model 702 includes a fully connected layer (DENSE) and a gated recurrent unit (GRU). Exemplarily, a quantity of neurons of a GRU1 is 24, a quantity of neurons of a DENSE2 is 96, quantities of neurons of a GRU2 and a GRU3 are 256, and a quantity of neurons of a DENSE3 is 1. The network packet loss flag 703 is inputted into the DENSE1 for extracting a network status feature. At the same time, the sample audio feature parameter 704 is inputted into the DENSE2 for extracting audio features, the audio features are fused through the GRU2 and the GRU3, and then are inputted into the DENSE3. The DENSE3 outputs a probability of each preset encoding bit rate, and then determines a preset encoding bit rate with a highest probability as the current frame encoding bit rate corresponding to the current sample audio frame.

For example, the encoding bit rate prediction model 702 may further use another network structure. For example, the encoding bit rate prediction model 702 only includes the fully connected layer.

In the model training process, a previous frame encoding bit rate is returned to a network model to be used as a basis for prediction of next frame encoding bit rate. Correspondingly, in an actual application process, to further improve the audio encoding quality, each frame audio encoding bit rate outputted by the encoding bit rate prediction model can also be returned to the model, to provide a reference for prediction of next frame encoding bit rate.

Figure 8:
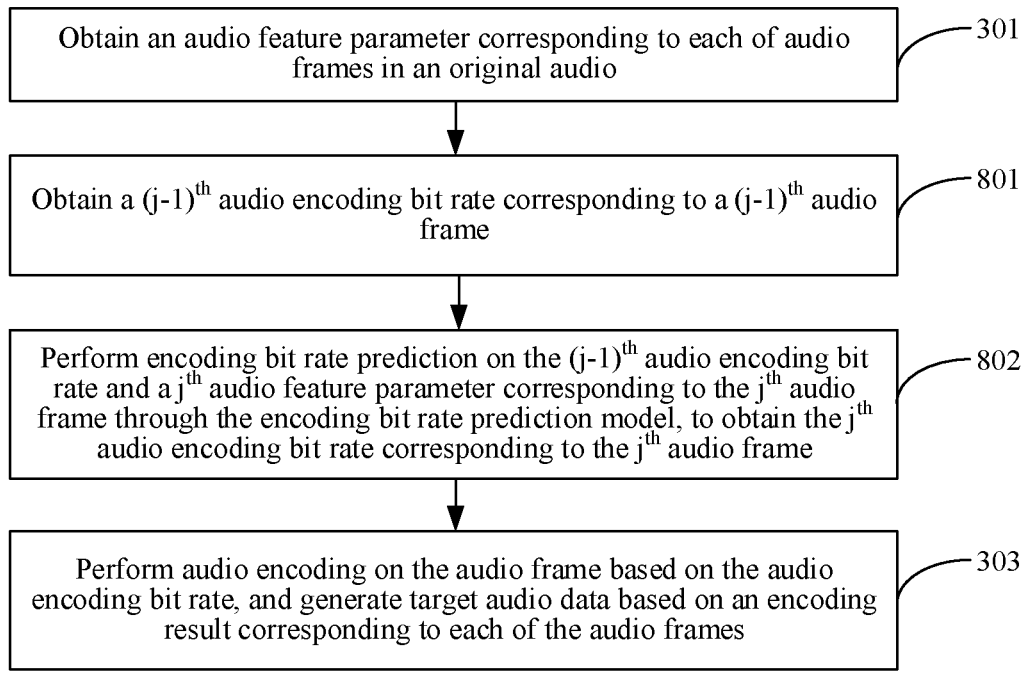
FIG. 8 shows a flowchart of an audio encoding method according to an embodiment of this application.

Based on FIG. 3, as shown in FIG. 8, step 302 may be replaced with step 801 and step 802.

Step 801. Obtain a $(j-1)^{th}$ audio encoding bit rate corresponding to a $(j-1)^{th}$ audio frame.

j is an increasing integer and a value range thereof is $1 < j \leq M$, M is a quantity of the audio frames, and M is an integer larger than 1.

In some embodiments, after the encoding bit rate prediction model predicts the $(j-1)^{th}$ audio encoding bit rate corresponding to the $(j-1)^{th}$ audio frame, in addition to being used for subsequently performing audio encoding on the $(j-1)^{th}$ audio frame based on the $(j-1)^{th}$ audio encoding bit rate, the $(j-1)^{th}$ audio encoding bit rate may also be re-inputted into the encoding bit rate prediction model for providing a reference basis for prediction of a $j^{th}$ audio encoding bit rate corresponding to a $j^{th}$ audio frame.

Step 802. Perform encoding bit rate prediction on the $(j-1)^{th}$ audio encoding bit rate and a $j^{th}$ audio feature parameter corresponding to the $j^{th}$ audio frame through the encoding bit rate prediction model, to obtain the $j^{th}$ audio encoding bit rate corresponding to the $j^{th}$ audio frame.

In some embodiments, when the $j^{th}$ audio encoding bit rate corresponding to the $j^{th}$ audio frame is predicted, the $(j-1)^{th}$ audio encoding bit rate corresponding to the $(j-1)^{th}$ audio frame may be obtained, so that the $(j-1)^{th}$ audio encoding bit rate and a $j^{th}$ audio feature parameter are jointly inputted into the encoding bit rate prediction model. The $(j-1)^{th}$ audio encoding bit rate provides a prediction basis for the $j^{th}$ audio encoding bit rate, to obtain the $j^{th}$ audio encoding bit rate outputted by the encoding bit rate prediction model.

In some embodiments, by returning a previous frame audio encoding bit rate to the encoding bit rate prediction model, a reference role may be provided for prediction of next frame audio encoding bit rate, so that great fluctuation of the audio encoding bit rate in the encoding bit rate prediction process can be avoided, and the prediction accuracy of the audio encoding bit rate can be improved.

For some specific application scenarios, such as a speech call scenario, a live streaming scenario and other scenarios that require online transmission of audio data, a network status affects speech quality received by a receiving end. Therefore, in the specific application scenarios, to avoid the influence of the network status on the speech quality, an influence of a current network status needs to be considered when generating an audio encoding bit rate.

Figure 9:
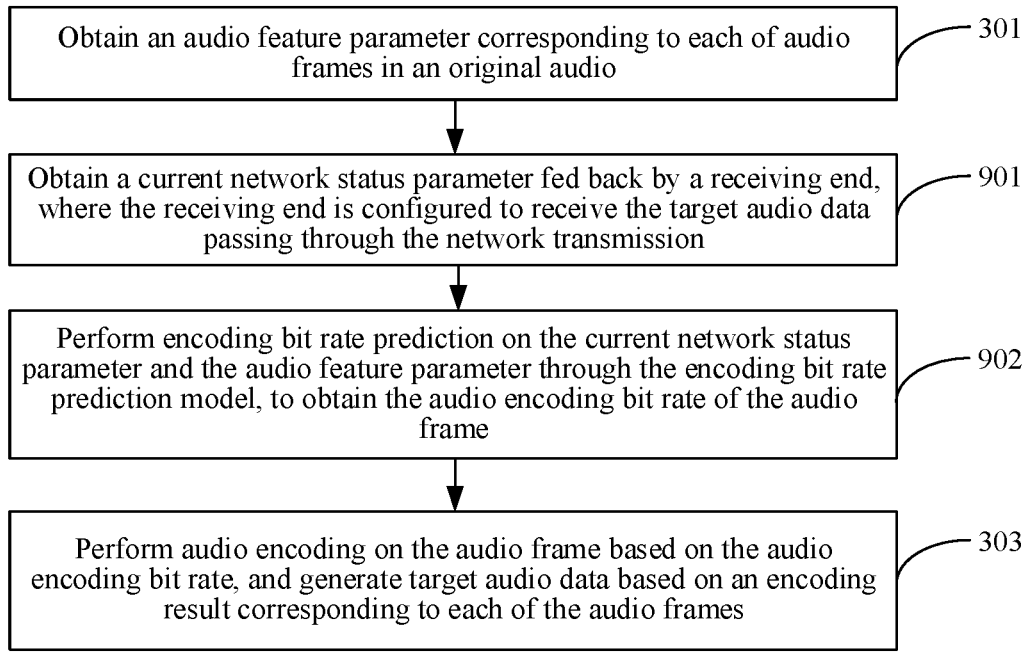
FIG. 9 shows a flowchart of an audio encoding method according to an embodiment of this application.

Based on FIG. 3, as shown in FIG. 9, step 302 may be replaced with step 901 and step 902.

Step 901. Obtain a current network status parameter fed back by a receiving end, where the receiving end is configured to receive the target audio data passing through the network transmission.

In a possible application scenario, the target audio data after audio encoding needs to be transmitted to another terminal (that is, the receiving end) through a network, and a network status also has a certain influence on the process of audio encoding. Exemplarily, if the network status is worse, correspondingly, a smaller encoding bit rate is used; and if the network status is better, a larger encoding bit rate is used. Therefore, for the audio data for network transmission, the current network status parameter fed back by the receiving end also needs to be considered in the process of encoding bit rate prediction.

The network status parameter may be returned by the receiving end. By using the network status parameter being a packet loss rate as an example, the receiving end counts a network packet loss rate in a certain time, and returns the network packet loss rate to a transmit end. When the transmit end receives the packet loss rate, the packet loss rate may be used as the network status parameter and inputted into the encoding bit rate prediction model, so that a current network status can be considered when the audio encoding bit rate is predicted.

Exemplarily, the transmit end may obtain the network status parameter from the receiving end every set time, or the receiving end may return the network status parameter to the transmit end every predetermined time. The set time may be 30 mins.

Step 902. Perform encoding bit rate prediction on the current network status parameter and the audio feature parameter through the encoding bit rate prediction model, to obtain the audio encoding bit rate of the audio frame.

In some embodiments, when the audio encoding bit rate corresponding to the audio frame is predicted, considering the influence of the current network status, the obtained current network status parameter and the audio feature parameter corresponding to the audio frame may be inputted into the encoding bit rate prediction model, so that the influence factor of the current network status is considered when the audio encoding bit rate is predicted, thereby obtaining the audio encoding bit rate outputted by the encoding bit rate prediction model.

After the transmit end encodes the audio based on the audio encoding bit rate and transmits an encoding result to the receiving end through the network, the receiving end can receive a good audio signal because the current network status has been considered for the audio encoding bit rate used in the process of audio encoding.

For example, to further improve the accuracy of encoding prediction in a specific application scenario, in the process of encoding bit rate prediction, an audio encoding bit rate corresponding to a previous audio frame may also be returned to the encoding bit rate prediction model, so as to provide a reference for prediction of an audio encoding bit rate corresponding to next audio frame.

In some embodiments, the network status parameter, a $(j-1)^{th}$ audio encoding bit rate (an audio encoding bit rate corresponding to a $(j-1)^{th}$ audio frame), and a $j^{th}$ audio feature parameter may be inputted into the encoding bit rate prediction model, where the network status parameter provides a current network status reference for a $j^{th}$ audio encoding bit rate, and the $(j-1)^{th}$ audio encoding bit rate provides an encoding bit rate prediction reference for the $j^{th}$ audio encoding bit rate, so that the encoding bit rate prediction model outputs the $j^{th}$ audio encoding bit rate corresponding to the $j^{th}$ audio frame. j is an integer larger than 1.

In some embodiments, by adding the network status parameter in the process of predicting the audio encoding bit rate, the encoding bit rate prediction model can consider an influence of a network status on the encoding bit rate during encoding bit rate prediction, thereby further improving the audio encoding quality corresponding to a specific scenario (such as, a speech call scenario).

Figure 10:
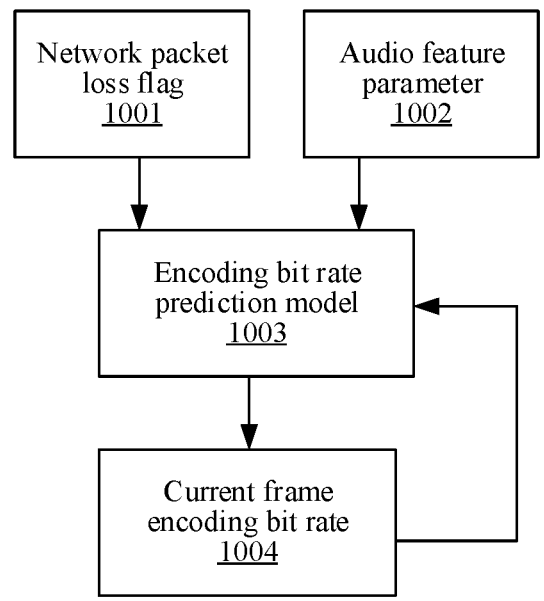
FIG. 10 shows a schematic diagram of a process of audio encoding according to an embodiment of this application.

FIG. 10 shows a schematic diagram of a process of audio encoding according to an embodiment of this application. In a model application process, a network packet loss flag 1001 (namely, a network status parameter) and an audio feature parameter 1002 may be inputted into an encoding bit rate prediction model 1003, so as to output a current frame encoding bit rate 1004. For example, the current frame encoding bit rate 1004 may also be inputted into the encoding bit rate prediction model to provide a reference basis for prediction of next frame encoding bit rate. Audio encoding is performed based on an audio encoding bit rate corresponding to each of the audio frames, and audio encoding data corresponding to an original audio is generated based on an encoding result corresponding to each of the audio frames.

Figure 11:
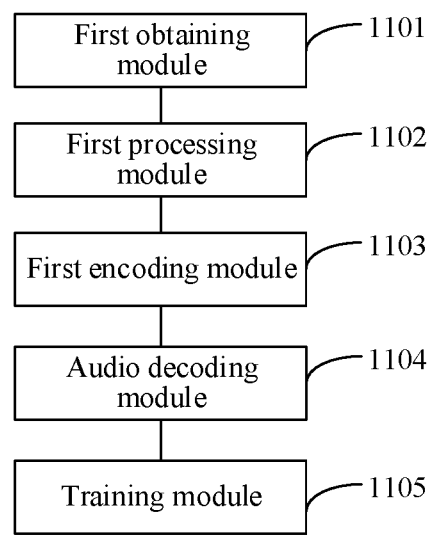
FIG. 11 shows a structural block diagram of an audio encoding apparatus according to an embodiment of this application.

FIG. 11 shows a structural block diagram of an audio encoding apparatus according to an embodiment of this application. The audio encoding apparatus may be implemented as an entire computer device or a part of the computer device by using software, hardware, or a combination thereof. The audio encoding apparatus may include:

a first obtaining module 1101, configured to obtain a sample audio feature parameter corresponding to each of sample audio frames in a first sample audio; a first processing module 1102, configured to perform encoding bit rate prediction on the sample audio feature parameter through an encoding bit rate prediction model, to obtain a sample encoding bit rate of the sample audio frame; a first encoding module 1103, configured to perform audio encoding on the sample audio frame based on the sample encoding bit rate, and generate sample audio data based on an encoding result corresponding to each of the sample audio frames; an audio decoding module 1104, configured to perform audio decoding on the sample audio data, to obtain a second sample audio corresponding to the sample audio data; and a training module 1105, configured to train the encoding bit rate prediction model based on the first sample audio and the second sample audio, and end the training until a sample encoding quality score reaches a target encoding quality score, the sample encoding quality score being determined through the first sample audio and the second sample audio.

In some embodiments, the apparatus further includes: a second obtaining module, configured to obtain a sample network status parameter of the first sample audio; and the first processing module 1102 includes: a first processing unit, configured to perform encoding bit rate prediction on the sample network status parameter and the sample audio feature parameter through the encoding bit rate prediction model, to obtain the sample encoding bit rate of the sample audio frame.

In some embodiments, the apparatus further includes: a third obtaining module, configured to obtain an $(i-1)^{th}$ sample encoding bit rate corresponding to an $(i-1)^{th}$ sample audio frame; and the first processing module 1102 includes: a second processing unit, configured to perform encoding bit rate prediction on an $i^{th}$ sample audio feature parameter and the $(i-1)^{th}$ sample encoding bit rate through the encoding bit rate prediction model, to obtain an $i^{th}$ sample encoding bit rate corresponding to an $i^{th}$ sample audio frame, where i is an increasing integer and a value range thereof is $1<i\leq N$, N is a quantity of the sample audio frames, and N is an integer larger than 1.

In some embodiments, the training module 1105 includes: a determining unit, configured to determine the sample encoding quality score corresponding to the first sample audio based on the first sample audio and the second sample audio; and a training unit, configured to train the encoding bit rate prediction model based on the sample encoding quality score and the target encoding quality score.

In some embodiments, the training unit is further configured to: determine an average encoding bit rate corresponding to the first sample audio, where the average encoding bit rate is determined through the sample encoding bit rates corresponding to the sample audio frames; construct a first encoding loss corresponding to the first sample audio based on the average encoding bit rate, the sample encoding quality score, and the target encoding quality score; and train the encoding bit rate prediction model based on the first encoding loss and a preset encoding loss.

In some embodiments, the training unit is further configured to: obtain a first loss weight corresponding to the average encoding bit rate and a second loss weight corresponding to an encoding quality score, where the encoding quality score is determined through the sample encoding quality score and the target encoding quality score; and construct the first encoding loss corresponding to the first sample audio based on the average encoding bit rate, the first loss weight, the encoding quality score, and the second loss weight.

In some embodiments, a type of the sample audio feature parameter includes at least one of the following: a fixed gain, an adaptive gain, a pitch period, a pitch frequency, or a line spectrum pair parameter.

In summary, in this embodiment of this application, in a process of training an encoding bit rate prediction model, a sample audio feature parameter corresponding to each of sample audio frames in a sample audio is analyzed, so as to predict a sample audio encoding bit rate corresponding to each of the sample audio frames based on the sample audio feature parameter; audio encoding is performed on the sample audio frame based on the sample encoding bit rate corresponding to each of the sample audio frames; and after audio decoding is performed on an audio encoding result, the encoding bit rate prediction model is trained through comparing an audio after audio decoding with an original audio. In this way, in an actual application process, the encoding bit rate prediction model has a function capable of dynamically adjusting an audio encoding bit rate based on an audio feature parameter, and the audio encoding bit rate can be reduced as much as possible while the audio encoding quality meets target requirements, so that the storage space of audio data and bandwidth consumption in a process of audio data transmission can be reduced.

Figure 12:
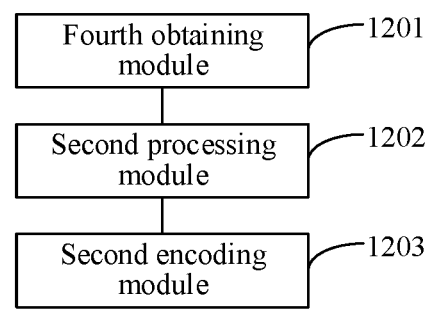
FIG. 12 shows a structural block diagram of an audio encoding apparatus according to an embodiment of this application.

FIG. 12 shows a structural block diagram of an audio encoding apparatus according to an embodiment of this application. The audio encoding apparatus may be implemented as an entire computer device or a part of the computer device by using software, hardware, or a combination thereof. The audio encoding apparatus may include:

a fourth obtaining module 1201, configured to obtain an audio feature parameter corresponding to each of audio frames in an original audio;

a second processing module 1202, configured to perform encoding bit rate prediction on the audio feature parameter through an encoding bit rate prediction model, to obtain an audio encoding bit rate of the audio frame, the encoding bit rate prediction model being configured to predict the audio encoding bit rate corresponding to each of the audio frames when a target encoding quality score is reached; and a second encoding module 1203, configured to perform audio encoding on the audio frame based on the audio encoding bit rate, and generate target audio data based on an encoding result corresponding to each of the audio frames.

In some embodiments, the target audio data is used for network transmission;

the apparatus further includes:

a fifth obtaining module, configured to obtain a current network status parameter fed back by a receiving end, where the receiving end is configured to receive the target audio data passing through the network transmission; and the second processing module 1202 includes: a third processing unit, configured to perform encoding bit rate prediction on the current network status parameter and the audio feature parameter through the encoding bit rate prediction model, to obtain the audio encoding bit rate of the audio frame.

In some embodiments, the apparatus further includes:

a sixth obtaining module, configured to obtain a $(j-1)^{th}$ audio encoding bit rate corresponding to a $(j-1)^{th}$ audio frame; and the second processing module 1202 includes: a fourth processing unit, configured to perform encoding bit rate prediction on the $(j-1)^{th}$ audio encoding bit rate and a $j^{th}$ audio feature parameter corresponding to a $j^{th}$ audio frame through the encoding bit rate prediction model, to obtain a $j^{th}$ audio encoding bit rate corresponding to the $j^{th}$ audio frame, where j is an increasing integer and a value range thereof is $1<j\leq M$, M is a quantity of the audio frames, and M is an integer larger than 1.

In some embodiments, a type of the audio feature parameter includes at least one of the following: a fixed gain, an adaptive gain, a pitch period, a pitch frequency, or a line spectrum pair parameter.

In summary, in this embodiment of this application, an audio feature parameter corresponding to each of audio frames in an original audio is analyzed to realize the objective of dynamically adjusting an audio encoding bit rate corresponding to the audio frame based on the audio feature parameter, which can determine the audio encoding bit rate matching the audio feature parameter for each of the audio frames, thereby improving the encoding quality of the whole audio. Compared with the use of a fixed encoding bit rate in the related art, by performing audio encoding by using a dynamic encoding bit rate in this embodiment, the audio encoding bit rate can be reduced as much as possible while the audio encoding quality meets target requirements, so that the storage space of audio data and bandwidth consumption in a process of audio data transmission can be reduced.

An embodiment of this application further provides an audio decoding apparatus. The audio decoding apparatus may be implemented as an entire computer device or a part of the computer device by using software, hardware, or a combination thereof. The audio decoding apparatus may include:

a fifth obtaining module, configured to obtain encoded target audio data; and a decoding module, configured to perform audio decoding on the encoded target audio data through an audio decoding bit rate corresponding to an audio encoding bit rate, to obtain decoded target audio data.

Figure 13:
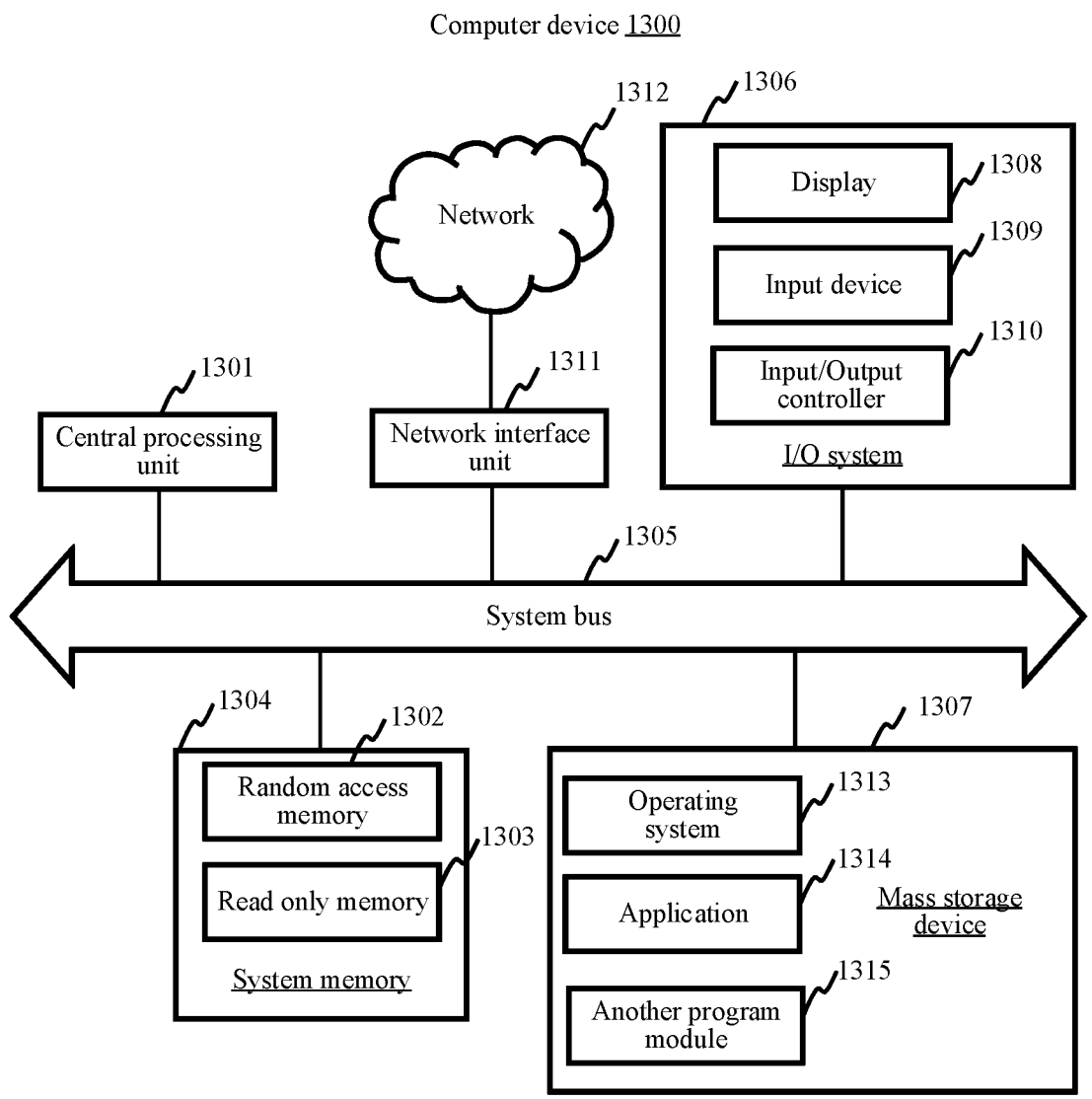
FIG. 13 shows a structural block diagram of a computer device according to an embodiment of this application.

FIG. 13 shows a structural block diagram of a computer device according to an embodiment of this application. The computer device may be configured to implement the audio encoding method or the audio decoding method described in the foregoing embodiments. Specifically, a computer device 1300 includes a central processing unit (CPU) 1301, a random access memory (RAM) 1302, a system memory 1304 of a read only memory (ROM) 1303, and a system bus 1305 connecting the system memory 1304 to the CPU 1301. The computer device 1300 further includes a basic input/output system (I/O system) 1306 configured to transmit information between components in the computer device, and a mass storage device 1307 configured to store an operating system 1313, an application 1314, and another program module 1315.

The basic I/O system 1306 includes a display 1308 configured to display information and an input device 1309 such as a mouse or a keyboard that is used for inputting information by a user. The display 1308 and the input device 1309 are connected to an I/O controller 1310 of the system bus 1305, to be connected to the CPU 1301. The basic I/O system 1306 may further include the input/output controller 1310, to receive and process inputs from a plurality of other devices, such as the keyboard, the mouse, or an electronic stylus. Similarly, the input/output controller 1310 further provides an output to a display, a printer or another type of output device.

The mass storage device 1307 is connected to the CPU 1301 by using a mass storage controller (not shown) connected to the system bus 1305. The mass storage device 1307 and an associated computer-readable storage medium thereof provide non-volatile storage for the computer device 1300. That is, the mass storage device 1307 may include a computer-readable storage medium (not shown) such as a hard disk or a compact disc ROM (CD-ROM) drive.

Without loss of generality, the computer-readable storage medium may include a computer storage medium and a communication medium. The computer storage medium includes volatile and non-volatile media, and removable and non-removable media implemented by using any method or technology and configured to store information such as a computer-readable storage instruction, a data structure, a program module, or other data. The computer storage medium includes a RAM, a ROM, an erasable programmable ROM (EPROM), an electrically erasable programmable ROM (EEPROM), a flash memory or another solid-state memory technology, CD-ROM, a digital versatile disc (DVD) or another optical memory, a tape cartridge, a magnetic cassette, a magnetic disk memory, or another magnetic storage device. Certainly, a person skilled in the art may know that the computer storage medium is not limited to the foregoing types. The system memory 1304 and the mass storage device 1307 may be collectively referred to as a memory.

The memory stores one or more programs, and the one or more programs are configured to be executed by one or more CPUs 1301. The one or more programs include instructions used for implementing the foregoing method embodiments, and the CPU 1301 executes the one or more programs to implement the method provided in the foregoing method embodiments.

According to the embodiments of this application, the computer device 1300 may further be connected, through a network such as the Internet, to a remote server on the network and run. That is, the computer device 1300 may be connected to a network 1312 by using a network interface unit 1311 connected to the system bus 1305, or may be connected to another type of network or a remote server system (not shown) by using a network interface unit 1311.

The memory further includes one or more programs. The one or more programs are stored in the memory and include steps to be executed by the computer device in the method provided in the embodiments of this application.

An embodiment of this application further provides a computer-readable storage medium, storing at least one instruction, the at least one instruction being loaded and executed by a processor to implement the audio encoding method or the audio decoding method described in the foregoing embodiments.

An embodiment of this application provides a computer program product or a computer program, the computer program product or the computer program including computer instructions, the computer instructions being stored in a computer-readable storage medium. A processor of a computer device reads the computer instructions from the computer-readable storage medium, and executes the computer instructions, so that the computer device performs the audio encoding method or the audio decoding method described in the various implementations.

Other embodiments of this application will be apparent to a person skilled in the art from consideration of the specification and practice of the disclosure here. This application is intended to cover any variations, uses or adaptive changes of this application. Such variations, uses or adaptive changes follow the general principles of this application, and include well-known knowledge and conventional technical means in the art that are not disclosed in this application. The specification and the embodiments are considered as merely exemplary, and the scope and spirit of this application are pointed out in the following claims.

It is to be understood that this application is not limited to the precise structures described above and shown in the accompanying drawings, and various modifications and changes can be made without departing from the scope of this application. The scope of this application is limited by the appended claims only. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for training an encoding bit rate prediction model, performed by a computer device, the method comprising:

obtaining a sample audio feature parameter corresponding to each of sample audio frames in a first sample audio, further including obtaining an $(i-1)^{th}$ sample encoding bit rate corresponding to an $(i-1)^{th}$ sample audio frame;
performing encoding bit rate prediction on the sample audio feature parameter through an encoding bit rate prediction model, to obtain a sample encoding bit rate for each of the sample audio frames, further including:
performing encoding bit rate prediction on an $i^{th}$ sample audio feature parameter and the $(i-1)^{th}$ sample encoding bit rate through the encoding bit rate prediction model, to obtain an $i^{th}$ sample encoding bit rate corresponding to an $i^{th}$ sample audio frame, wherein i is an increasing integer and a value range thereof is $1<i\leq N$, N is a quantity of the sample audio frames, and N is an integer larger than 1;
performing audio encoding on the sample audio frames based on the corresponding sample encoding bit rates to generate sample audio data corresponding to the sample audio frames;
performing audio decoding on the sample audio data, to obtain a second sample audio corresponding to the sample audio data; and
training the encoding bit rate prediction model based on the first sample audio and the second sample audio until a sample encoding quality score reaches a target encoding quality score,
the sample encoding quality score being determined through the first sample audio and the second sample audio.

2. The method according to claim 1, wherein the method further comprises:
obtaining a sample network status parameter of the first sample audio; and
the performing encoding bit rate prediction on the sample audio feature parameter through an encoding bit rate prediction model, to obtain a sample encoding bit rate for each of the sample audio frames comprises:
performing encoding bit rate prediction on the sample network status parameter and the sample audio feature parameter through the encoding bit rate prediction model, to obtain the sample encoding bit rate for each of the sample audio frames.

3. The method according to claim 1, wherein the training the encoding bit rate prediction model based on the first sample audio and the second sample audio comprises:
determining the sample encoding quality score corresponding to the first sample audio based on the first sample audio and the second sample audio; and
training the encoding bit rate prediction model based on the sample encoding quality score and the target encoding quality score.

4. The method according to claim 3, wherein the training the encoding bit rate prediction model based on the sample encoding quality score and the target encoding quality score comprises:
determining an average encoding bit rate corresponding to the first sample audio, wherein the average encoding bit rate is determined through the sample encoding bit rates corresponding to the sample audio frames in the first sample audio;
constructing a first encoding loss corresponding to the first sample audio based on the average encoding bit rate, the sample encoding quality score, and the target encoding quality score; and
training the encoding bit rate prediction model based on the first encoding loss and a preset encoding loss.

5. The method according to claim 4, wherein the constructing a first encoding loss corresponding to the first sample audio based on the average encoding bit rate, the sample encoding quality score, and the target encoding quality score comprises:
obtaining a first loss weight corresponding to the average encoding bit rate and a second loss weight corresponding to an encoding quality score, wherein the encoding quality score is determined through the sample encoding quality score and the target encoding quality score; and
constructing the first encoding loss corresponding to the first sample audio based on the average encoding bit rate, the first loss weight, the encoding quality score, and the second loss weight.

6. The method according to claim 1, wherein a type of the sample audio feature parameter comprises at least one of the following: a fixed gain, an adaptive gain, a pitch period, a pitch frequency, or a line spectrum pair parameter.

7. A computer device, comprising a processor and a memory, the memory storing at least one program, the at least one program being loaded and executed by the processor and causing the computer device to implement a method for training an encoding bit rate prediction model, the method including:
obtaining a sample audio feature parameter corresponding to each of sample audio frames in a first sample audio, further including obtaining an $(i-1)^{th}$ sample encoding bit rate corresponding to an $(i-1)^{th}$ sample audio frame;
performing encoding bit rate prediction on the sample audio feature parameter through an encoding bit rate prediction model, to obtain a sample encoding bit rate for each of the sample audio frames, further including:
performing encoding bit rate prediction on an $i^{th}$ sample audio feature parameter and the $(i-1)^{th}$ sample encoding bit rate through the encoding bit rate prediction model, to obtain an $i^{th}$ sample encoding bit rate corresponding to an $i^{th}$ sample audio frame, wherein i is an increasing integer and a value range thereof is $1<i\leq N$, N is a quantity of the sample audio frames, and N is an integer larger than 1;
performing audio encoding on the sample audio frames based on the corresponding sample encoding bit rates to generate sample audio data corresponding to the sample audio frames;
performing audio decoding on the sample audio data, to obtain a second sample audio corresponding to the sample audio data; and
training the encoding bit rate prediction model based on the first sample audio and the second sample audio until a sample encoding quality score reaches a target encoding quality score,
the sample encoding quality score being determined through the first sample audio and the second sample audio.

8. The computer device according to claim 7, wherein the method further comprises:
obtaining a sample network status parameter of the first sample audio; and
the performing encoding bit rate prediction on the sample audio feature parameter through an encoding bit rate prediction model, to obtain a sample encoding bit rate for each of the sample audio frames comprises:
performing encoding bit rate prediction on the sample network status parameter and the sample audio feature parameter through the encoding bit rate prediction model, to obtain the sample encoding bit rate for each of the sample audio frames.

9. The computer device according to claim 7, wherein the training the encoding bit rate prediction model based on the first sample audio and the second sample audio comprises:
determining the sample encoding quality score corresponding to the first sample audio based on the first sample audio and the second sample audio; and
training the encoding bit rate prediction model based on the sample encoding quality score and the target encoding quality score.

10. The computer device according to claim 9, wherein the training the encoding bit rate prediction model based on the sample encoding quality score and the target encoding quality score comprises:
determining an average encoding bit rate corresponding to the first sample audio, wherein the average encoding bit rate is determined through the sample encoding bit rates corresponding to the sample audio frames in the first sample audio;
constructing a first encoding loss corresponding to the first sample audio based on the average encoding bit rate, the sample encoding quality score, and the target encoding quality score; and
training the encoding bit rate prediction model based on the first encoding loss and a preset encoding loss.

11. The computer device according to claim 10, wherein the constructing a first encoding loss corresponding to the first sample audio based on the average encoding bit rate, the sample encoding quality score, and the target encoding quality score comprises:
obtaining a first loss weight corresponding to the average encoding bit rate and a second loss weight corresponding to an encoding quality score, wherein the encoding quality score is determined through the sample encoding quality score and the target encoding quality score; and
constructing the first encoding loss corresponding to the first sample audio based on the average encoding bit rate, the first loss weight, the encoding quality score, and the second loss weight.

12. The computer device according to claim 7, wherein a type of the sample audio feature parameter comprises at least one of the following: a fixed gain, an adaptive gain, a pitch period, a pitch frequency, or a line spectrum pair parameter.

13. A non-transitory computer-readable storage medium, storing at least one program, the at least one program being loaded and executed by a processor of a computer device and causing the computer device to implement a method for training an encoding bit rate prediction model, the method including:
obtaining a sample audio feature parameter corresponding to each of sample audio frames in a first sample audio, further including obtaining an $(i-1)^{th}$ sample encoding bit rate corresponding to an $(i-1)^{th}$ sample audio frame;
performing encoding bit rate prediction on the sample audio feature parameter through an encoding bit rate prediction model, to obtain a sample encoding bit rate for each of the sample audio frames, further including:
performing encoding bit rate prediction on an $i^{th}$ sample audio feature parameter and the $(i-1)^{th}$ sample encoding bit rate through the encoding bit rate prediction model, to obtain an $i^{th}$ sample encoding bit rate corresponding to an $i^{th}$ sample audio frame, wherein i is an increasing integer and a value range thereof is $1<i\le N$, N is a quantity of the sample audio frames, and N is an integer larger than 1;
performing audio encoding on the sample audio frames based on the corresponding sample encoding bit rates to generate sample audio data corresponding to the sample audio frames;
performing audio decoding on the sample audio data, to obtain a second sample audio corresponding to the sample audio data; and
training the encoding bit rate prediction model based on the first sample audio and the second sample audio until a sample encoding quality score reaches a target encoding quality score,
the sample encoding quality score being determined through the first sample audio and the second sample audio.

14. The non-transitory computer-readable storage medium according to claim 13, wherein the method further comprises:
obtaining a sample network status parameter of the first sample audio; and
the performing encoding bit rate prediction on the sample audio feature parameter through an encoding bit rate prediction model, to obtain a sample encoding bit rate for each of the sample audio frames comprises:
performing encoding bit rate prediction on the sample network status parameter and the sample audio feature parameter through the encoding bit rate prediction model, to obtain the sample encoding bit rate for each of the sample audio frames.

15. The non-transitory computer-readable storage medium according to claim 13, wherein the training the encoding bit rate prediction model based on the first sample audio and the second sample audio comprises:
determining the sample encoding quality score corresponding to the first sample audio based on the first sample audio and the second sample audio; and
training the encoding bit rate prediction model based on the sample encoding quality score and the target encoding quality score.

16. The non-transitory computer-readable storage medium according to claim 15, wherein the training the encoding bit rate prediction model based on the sample encoding quality score and the target encoding quality score comprises:
determining an average encoding bit rate corresponding to the first sample audio, wherein the average encoding bit rate is determined through the sample encoding bit rates corresponding to the sample audio frames in the first sample audio;
constructing a first encoding loss corresponding to the first sample audio based on the average encoding bit rate, the sample encoding quality score, and the target encoding quality score; and
training the encoding bit rate prediction model based on the first encoding loss and a preset encoding loss.

17. The non-transitory computer-readable storage medium according to claim 13, wherein a type of the sample audio feature parameter comprises at least one of the following: a fixed gain, an adaptive gain, a pitch period, a pitch frequency, or a line spectrum pair parameter.

* * * * *